United States Patent
Chou et al.

(10) Patent No.: US 12,437,823 B2
(45) Date of Patent: Oct. 7, 2025

(54) MEMORY DEVICE AND READING METHOD THEREOF

(71) Applicant: MACRONIX INTERNATIONAL CO., LTD., Hsinchu (TW)

(72) Inventors: You-Liang Chou, Taichung (TW); Wen-Jer Tsai, Hualien (TW); Chun-Chang Lu, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 163 days.

(21) Appl. No.: 18/519,201

(22) Filed: Nov. 27, 2023

(65) Prior Publication Data

US 2024/0371456 A1 Nov. 7, 2024

Related U.S. Application Data

(60) Provisional application No. 63/464,204, filed on May 5, 2023.

(51) Int. Cl.
 *G11C 29/02* (2006.01)
 *G11C 8/08* (2006.01)
 *G11C 29/52* (2006.01)

(52) U.S. Cl.
 CPC .............. *G11C 29/022* (2013.01); *G11C 8/08* (2013.01); *G11C 29/52* (2013.01); *G11C 29/021* (2013.01)

(58) Field of Classification Search
 CPC ......... G11C 29/022; G11C 8/08; G11C 29/52; G11C 29/021
 USPC ..................................... 365/185.09
 See application file for complete search history.

(56) References Cited

U.S. PATENT DOCUMENTS

| | | | |
|---|---|---|---|
| 7,995,388 B1 * | 8/2011 | Winter | G11C 16/0483 365/185.17 |
| 8,365,030 B1 * | 1/2013 | Choi | G06F 11/1048 714/799 |
| 9,257,187 B2 | 2/2016 | Lin et al. | |
| 9,773,565 B1 | 9/2017 | Yeh | |
| 10,895,999 B2 | 1/2021 | Hsiao | |
| 2009/0049364 A1 * | 2/2009 | Jo | G11C 16/0483 714/763 |

(Continued)

FOREIGN PATENT DOCUMENTS

| | | |
|---|---|---|
| TW | 201535384 A | 9/2015 |
| TW | I615852 B | 2/2018 |
| TW | 202040575 A | 11/2020 |

*Primary Examiner* — Ly D Pham
(74) *Attorney, Agent, or Firm* — McClure, Qualey & Rodack, LLP

(57) ABSTRACT

A memory device and a reading method thereof are provided. The memory device at least includes a first word line, a second word line and a third word line. The reading method includes the following steps. A read procedure is executed to read a plurality of memory cells connected to the first word line. A recognition procedure is executed in response to at least one memory cell has an error. A re-read procedure is executed on the memory cell. The recognition procedure includes: applying a pass voltage to the first word line; applying a recognition voltage to at least one of the second word line and the third word line. The re-read procedure including: applying a second read voltage to the first word line; and applying a second pass voltage to the second word line and a third pass voltage to the third word line.

20 Claims, 19 Drawing Sheets

(56) References Cited

U.S. PATENT DOCUMENTS

| | | | |
|---|---|---|---|
| 2014/0140148 A1* | 5/2014 | An | G11C 16/06 |
| | | | 365/189.05 |
| 2015/0262693 A1* | 9/2015 | Kondo | G11C 11/5642 |
| | | | 365/185.12 |
| 2018/0076833 A1* | 3/2018 | Akamine | H03M 13/2909 |
| 2020/0005878 A1* | 1/2020 | Lu | G11C 11/5642 |
| 2020/0194094 A1* | 6/2020 | Yang | G11C 11/4099 |
| 2020/0211653 A1 | 7/2020 | Chen | |
| 2021/0366539 A1* | 11/2021 | Kim | H01L 24/08 |

* cited by examiner

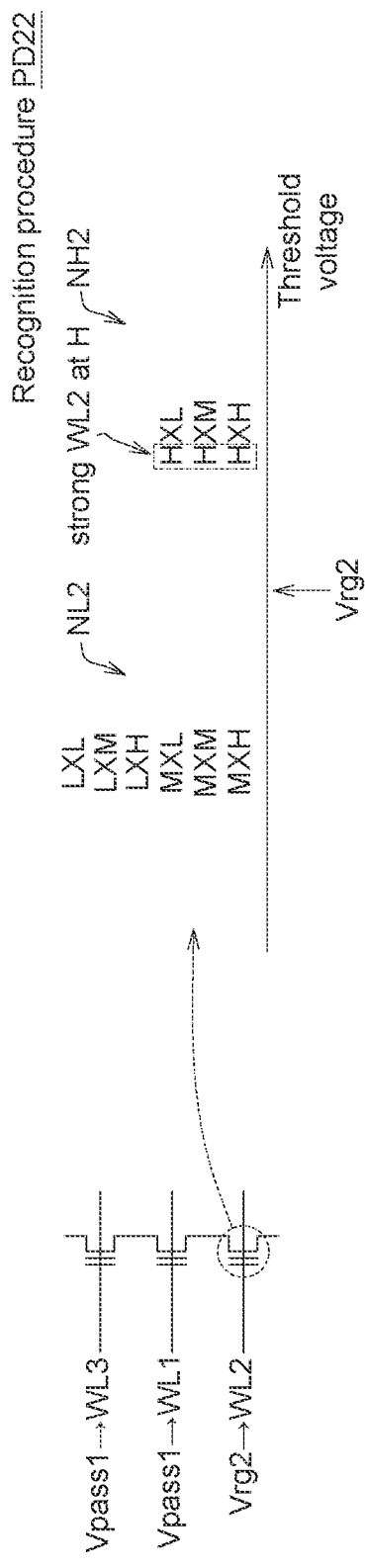
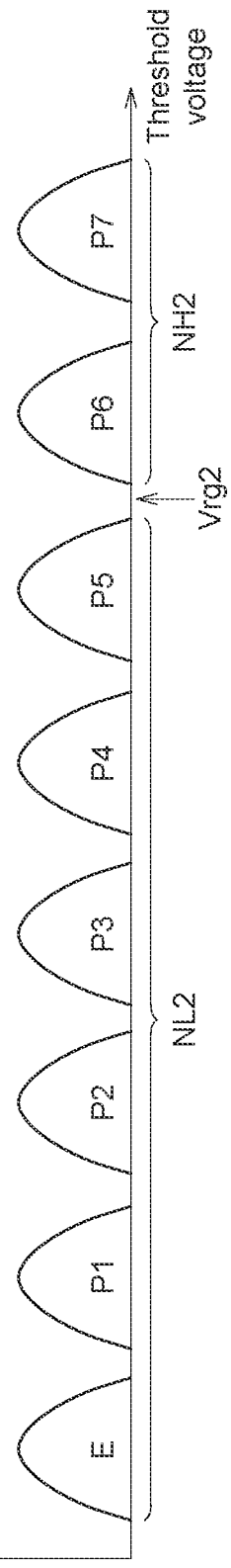
FIG. 13
FIG. 14

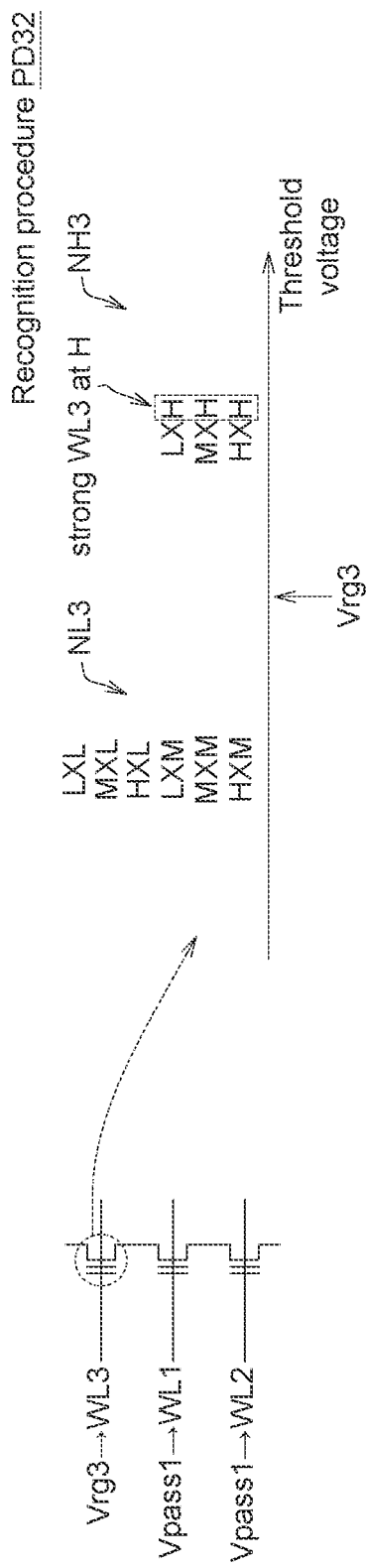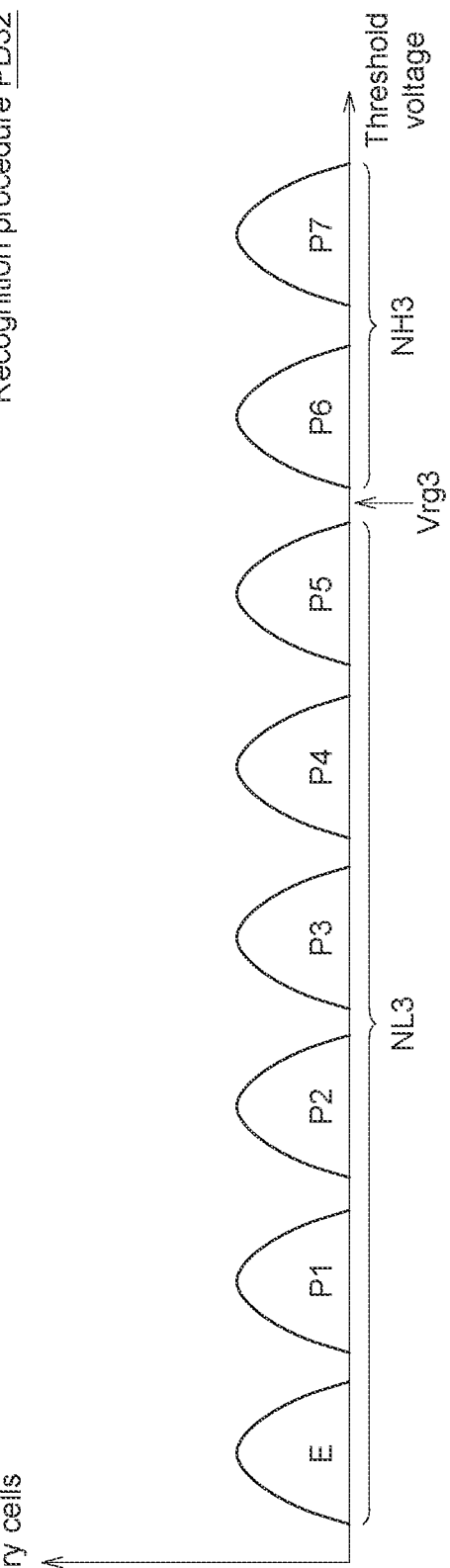
FIG. 18
FIG. 19

MEMORY DEVICE AND READING METHOD THEREOF

This application claims the benefit of U.S. provisional application Ser. No. 63/464,204, filed May 5, 2023, the subject matter of which is incorporated herein by reference.

TECHNICAL FIELD

The disclosure relates in general to an electrical element and an operation method thereof, and more particularly to a memory device and a reading method thereof.

BACKGROUND

With the development of memory, various kinds of memory are constantly being introduced. Memory can be used to store various digital data and has been widely used in various electronic devices. However, according to the physical characteristics of some memories, there will be a phenomenon of threshold voltage shift after long-term storage, which will lead to read errors. Therefore, it is necessary to reduce the read error rate through various technologies.

In order to reduce the read error rate, the Error-correcting codes (ECC) technology has been developed. However, the error correction technology requires an additional error correction operation circuit to check and correct data, and the error correction operation circuit will occupy a considerable area, seriously affecting the goal of miniaturization of electronic components. In addition, the error correction operation will also increase the memory read latency, seriously affecting the memory read speed. Furthermore, too many error correction operations will also reduce the lifespan of the memory. Therefore, researchers are working hard to develop innovative techniques to reduce the read error rate.

SUMMARY

The disclosure is directed to at least one embodiment of a memory device and a reading method thereof. After a controlling circuit reads the memory cells on the memory device, if a read error occurs on the memory cells of the selected word line, the controlling circuit recognizes the read voltage of the level state, and determines the read error occurs in a high level state group or a low level state group. After determining the read error occurring in the high level state group or the low level state group, the threshold voltage distribution curve of the memory cells of the specific level state group after retention can be evaluated to shift toward a lower threshold voltage or a higher threshold voltage. Then, the controlling circuit recognizes the neighboring data pattern, i.e. the neighboring-high-threshold-voltage group or the neighboring-low-threshold-voltage group for the memory cells of the selected (or failure) word line. Then, the controlling circuit executes a re-read procedure for a portion of the memory cells on the selected word line, so as to improve the reading efficiency and increase the reading accuracy.

According to one embodiment, a reading method of a memory device is provided. The memory device at least includes a first word line, a second word line and a third word line. The second word line and the third word line are adjacent to the first word line. The reading method includes the following steps. A read procedure is executed to read a plurality of memory cells connected to the first word line. A recognition procedure is executed in response to at least one memory cell of the plurality of memory cells has an error. A re-read procedure is executed. The read procedure includes: applying a first read voltage to the first word line; applying a first pass voltage to the second word line and the third word line, when the first read voltage is applied to the first word line. The recognition procedure includes: applying the first pass voltage to the first word line; applying a recognition voltage to at least one of the second word line and the third word line, when the first pass voltage is applied to the first word line. The re-read procedure including: applying a second read voltage to the first word line; and applying a second pass voltage to the second word line and a third pass voltage to the third word line, when the second read voltage is applied to the first word line.

According to another embodiment, a memory device is provided. The memory at least includes a first word line, a second word line, a third word line and a controlling circuit. The second word line and the third word line are adjacent to the first word line. The controlling circuit is configured to execute a read procedure to read a plurality of memory cells of the first word line; configured to execute, a recognition procedure in response to a read error of at least one memory cell of the plurality of memory cells; and configured to execute a re-read procedure. In the read procedure, the controlling circuit applies a first read voltage to the first word line; and the controlling circuit applies a first pass voltage to the second word line and the third word line when the first read voltage is applied to the first word line. In the recognition procedure, the controlling circuit applies the first pass voltage to the first word line; the controlling circuit applies a recognition voltage to at least one of the second word line and the third word line when the first pass voltage is applied to the first word line. In the re-read procedure, the controlling circuit applies the second read voltage to the first word line; and the controlling circuit applies a second pass voltage to the second word line and a third pass voltage to the third word line, when the second read voltage is applied to the first word line.

BRIEF DESCRIPTION OF THE DRAWINGS

FIG. 13 illustrates the recognition procedure according to another embodiment.

FIG. 14 shows the recognition voltage in FIG. 13 according to another embodiment.

FIG. 18 illustrates the recognition procedure according to another embodiment.

FIG. 19 shows the recognition voltage in FIG. 18 according to another embodiment.

Figure 1:
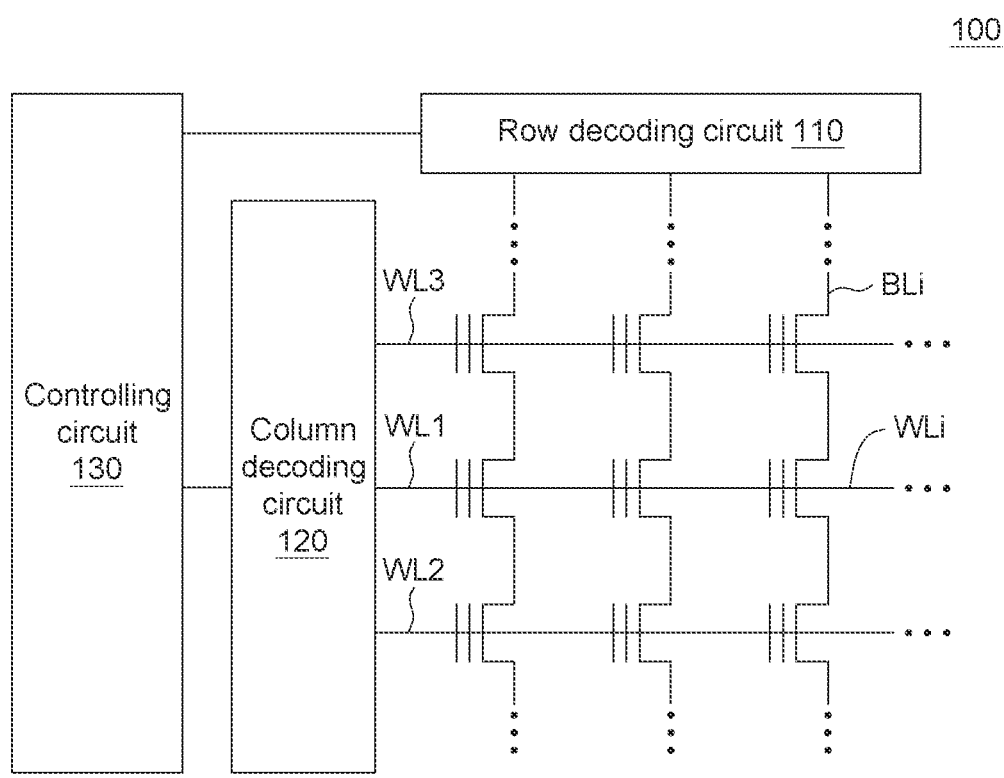
FIG. 1 shows a schematic diagram of a memory device according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please refer to FIG. 1, which shows a schematic diagram of a memory device 100 according to an embodiment. The memory device 100 is, for example, a NAND flash memory. The memory device 100 includes a plurality of bit lines BLi, a plurality of word lines WLi, a row decoding circuit 110, a column decoding circuit 120 and a controlling circuit 130. These word lines WLi include a first word line WL1, a second word line WL2 and a third word line WL3 which are adjacent. The second word line WL2 and the third word line WL3 are adjacent to the first word line WL1, and located at two sides of the first word line WL1.

The row decoding circuit 110 is electrically connected to the bit line BLi. The column decoding circuit 120 is electrically connected to the word line WLi. The controlling circuit 130 is electrically connected to the row decoding circuit 110 and the column decoding circuit 120. The controlling circuit 130 is used to control the voltages applied to the bit line BLi and the word lines WLi to execute an erase procedure, a programming procedure or a read procedure. In at least one example, the memory device 100 includes a plurality of memory strings and each of the memory strings includes a plurality of memory cells connected in series. The memory cells in the same memory string are connected to different word lines (e.g., the first word line WL1, the second word line WL2 and the third word line WL3), respectively. In a same column, the memory cells in the different memory strings are connected to a same word line, for example the first word line WL1 in FIG. 1.

Figure 2:
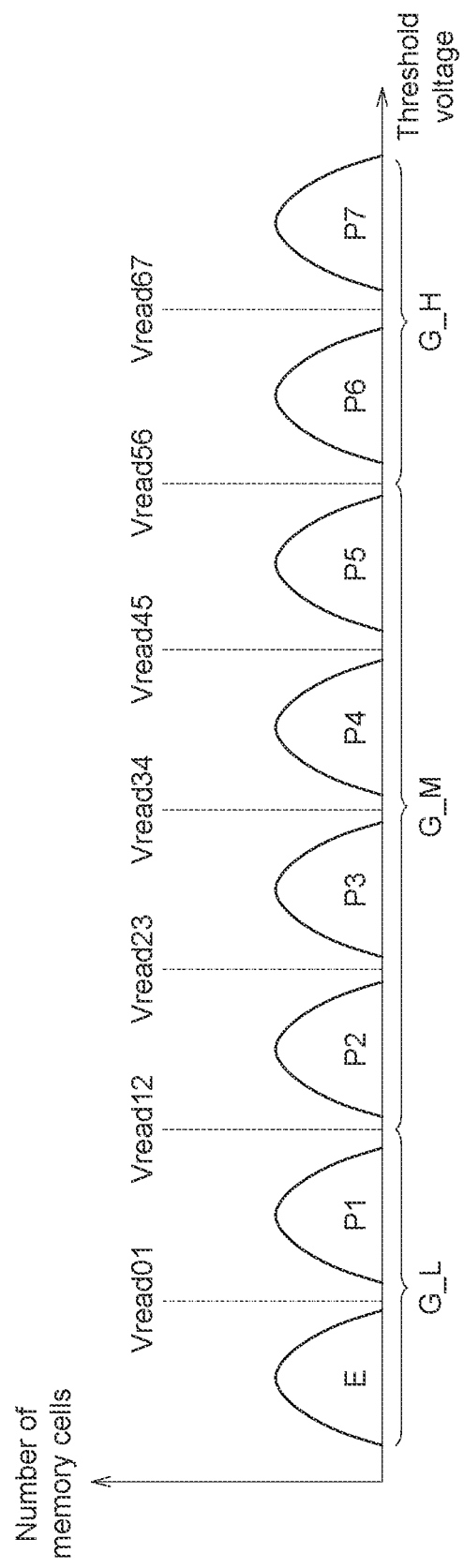
FIG. 2 shows a threshold voltage distribution curve of a plurality memory cells on a selected word line according to an embodiment.

Please refer to FIG. 2, which shows the threshold voltage distribution curve of the memory cells on a selected word line (e.g., the first word line WL1 shown in FIG. 1) according to an embodiment. Taking Triple Level Cell (TLC) for storing 3-bits data an example, the memory cells have 8 states: an erase state E, a first programming state P1, a second programming state P2, a third programming state P3, a fourth programming state P4, a fifth programming state P5, a sixth programming state P6 and a seventh programming state P7. The threshold voltages of the erase state E, the first programming state P1, the second programming state P2, the third programming state P3, the fourth programming state P4, the fifth programming state P5, the sixth programming state P6 and the seventh programming state P7 increase in sequence. In one embodiment, the erase state E and the first programming state P1 may be grouped into a low level state group G_L. The second programming state P2, the third programming state P3, the fourth programming state P4 and the fifth programming state P5 may be grouped into a medium level state group G_M. The sixth programming state P6 and the seventh programming state P7 may be grouped into a high level state group G_H.

In another embodiment, the erase state E, the first programming state P1 and the second programming state P2 may be grouped into the low level state group G_L. The third programming state P3 and the fourth programming state P4 may be grouped into the medium level state group G_M. The fifth programming state P5, the sixth programming state P6 and the seventh programming state P7 may be grouped into the high level state group G_H.

In another embodiment, the multi-level memory cells (MLCs) may be used to store 2-bits data, and have 4 states: the erase state, the first programming state, the second programming state and the third programming state. The threshold voltages of the erase state, the first programming state, the second programming state, the third programming state increase in sequence. The erase state may be grouped into the low level state group G_L. The first programming state and the second programming state may be grouped into the medium level state group G_M. The third programming state may be grouped into the high level state group G_H.

In another embodiment, the Quad-level memory cells (QLCs) may be used to store 4-bits data, and have 16 states: the erase state, the first programming state, the second programming state, the third programming state, the fourth programming state, the fifth programming state, the sixth programming state, the seventh programming state, an eighth programming state, a ninth programming state, a tenth programming state, an eleventh programming state, a twelfth programming state, a thirteenth programming state, a fourteenth programming state and a fifteenth programming state. The threshold voltages of the erase state, the first programming state, the second programming state until the fifteenth programming state increase in sequence. The erase state and the first programming state to the fourth programming state may be grouped into the low level state group G_L. The fifth programming state to the tenth programming state may be grouped into the medium level state group G_M. The eleventh programming state to the fifteenth programming state may be grouped into the high level state group G_H. The low level state group G_L and the high level state group G_H belong to the state marginal group.

The number of bits of the memory cells is not used to limit the present technology. In another embodiment, the memory cells may have various numbers of erase/program states.

As shown in FIG. 2, when the memory cells on a selected word line for reading (e.g., the first word line WL1 shown in FIG. 1) are just programmed, the threshold voltage distribution curve of the erase state E, the first programming state P1, the second programming state P2, the third programming state P3, the fourth programming state P4, the fifth programming state P5, the sixth programming state P6 and the seventh programming state P7 are respectively located in the 8 intervals distinguished by the read voltages Vread01, Vread12, Vread23, Vread34, Vread45, Vread56, Vread67. Therefore, during a reading operation, the data can be correctly read by using the read voltage Vread01, Vread12, Vread23, Vread34, Vread45, Vread56, Vread67. The erase state E or the first programming state P1 until the seventh programming state P7 are also referred as memory states (level states).

However, the memory cells may have a threshold voltage shift due to a long time of use, retention beyond a time interval or an affection by neighboring memory cells. The threshold voltage shift includes a lower shift of the high level state group G_H toward a lower threshold voltage as shown in FIG. 3 and a higher shift of the low level state group G_L toward a higher threshold voltage as shown in FIG. 4.

Figure 3:
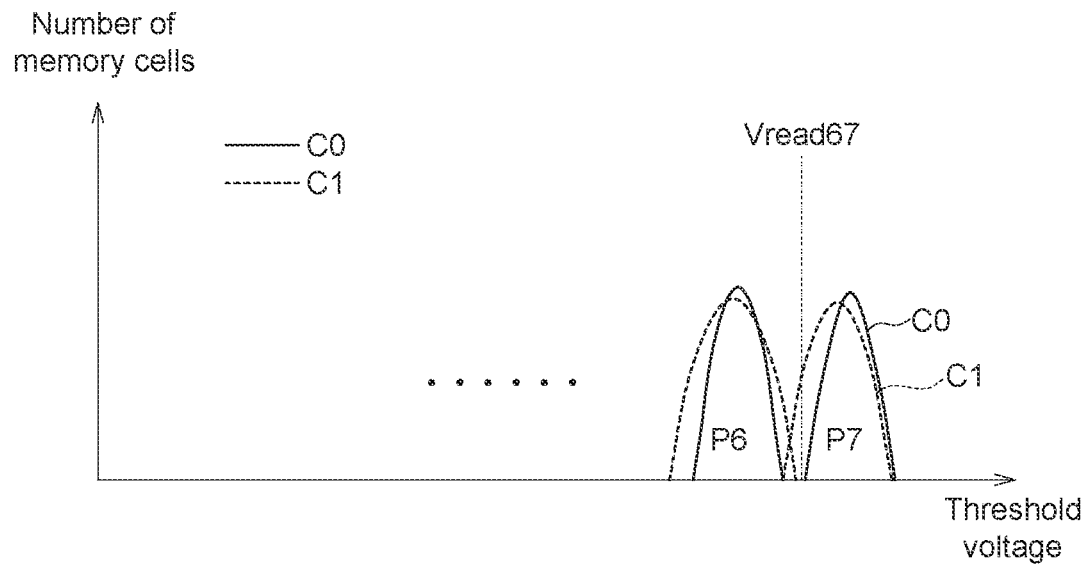
FIG. 3 illustrates the threshold voltage distribution curve of the high level state group.

FIG. 3 illustrates the threshold voltage distribution curve of the high level state group G_H (e.g., the sixth programming state P6 and the seventh programming state P7). Just after programmed, the threshold voltage distribution curve is shown as a solid line C0. The memory cells of the sixth programming state P6 and the seventh programming state P7 can be distinguished by applying the read voltage Vread67. After retention beyond a time interval from the programming, the threshold voltage distribution curve (shown as a dashed line C1) become broadened and shift toward a lower threshold voltage. The memory cells of the sixth programming state P6 and the seventh programming state P7 cannot be distinguished well by applying the same read voltage Vread67. Due to a portion of the distribution curve (shown as a dashed line C1) of the sixth programming state P6 and the seventh programming state P7 overlapping, the read error may occur. A portion of the memory cells in the seventh programming state P7 of the dashed line C1 may be recognized as an incorrected state (the sixth programming state P6). A portion of the memory cells in the sixth programming state P6 of the dashed line C1 may be recognized as an incorrected state (the seventh programming state P7).

Figure 4:
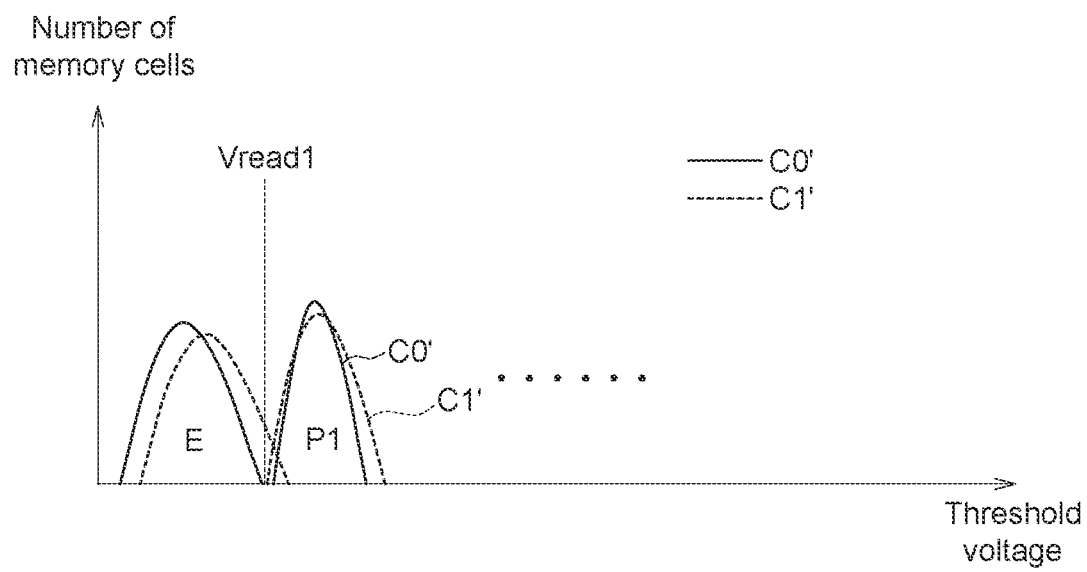
FIG. 4 illustrates the threshold voltage distribution curve of the low level state group.

FIG. 4 illustrates the threshold voltage distribution curve of the low level state group G_L (e.g., the erase state E, the first programming state P1). Just after programmed, the threshold voltage distribution curve is shown as a solid line C0'. The memory cells of the erase state E and the first programming state P1 can be distinguished by applying the read voltage Vread01. After retention beyond a time interval from the programming, the threshold voltage distribution curve (shown as a dashed line C1') become broadened and shift toward a higher threshold voltage. The memory cells of the erase state E and the first programming state P1 cannot be distinguished well by applying the same read voltage Vread01. Due to a portion of the distribution curve (shown as a dashed line C1') of the erase state E and the first programming state P1 overlapping, the read error may occur. A portion of the memory cells in the erase state E of the dashed line C1' may be recognized as an incorrected state (the first programming state P1). A portion of the memory cells in the first programming state P1 of the dashed line C1 may be recognized as an incorrected state (the erase state E).

In one embodiment, the controlling circuit 130 reads the memory cells of a selected word line (e.g., the first word line WL1) of the memory device 100 shown in FIG. 1. If a read error occurs, the controlling circuit 130 can judge whether the read error occurs in the high level state group G_H or the low level state group G_L. The threshold voltage shift direction of the threshold voltage distribution curve in the memory cells of the selected word line (e.g., the first word line WL1) can be determined. Then, the controlling circuit 130 perform a recognition procedure for neighboring data patterns of the selected word line (e.g., the first word line WL1). Then, the controlling circuit 130 executes a re-read procedure on the memory cells of the selected word line (e.g., the first word line WL1), so as to narrow the read error range and increase the reading accuracy.

Figure 5:
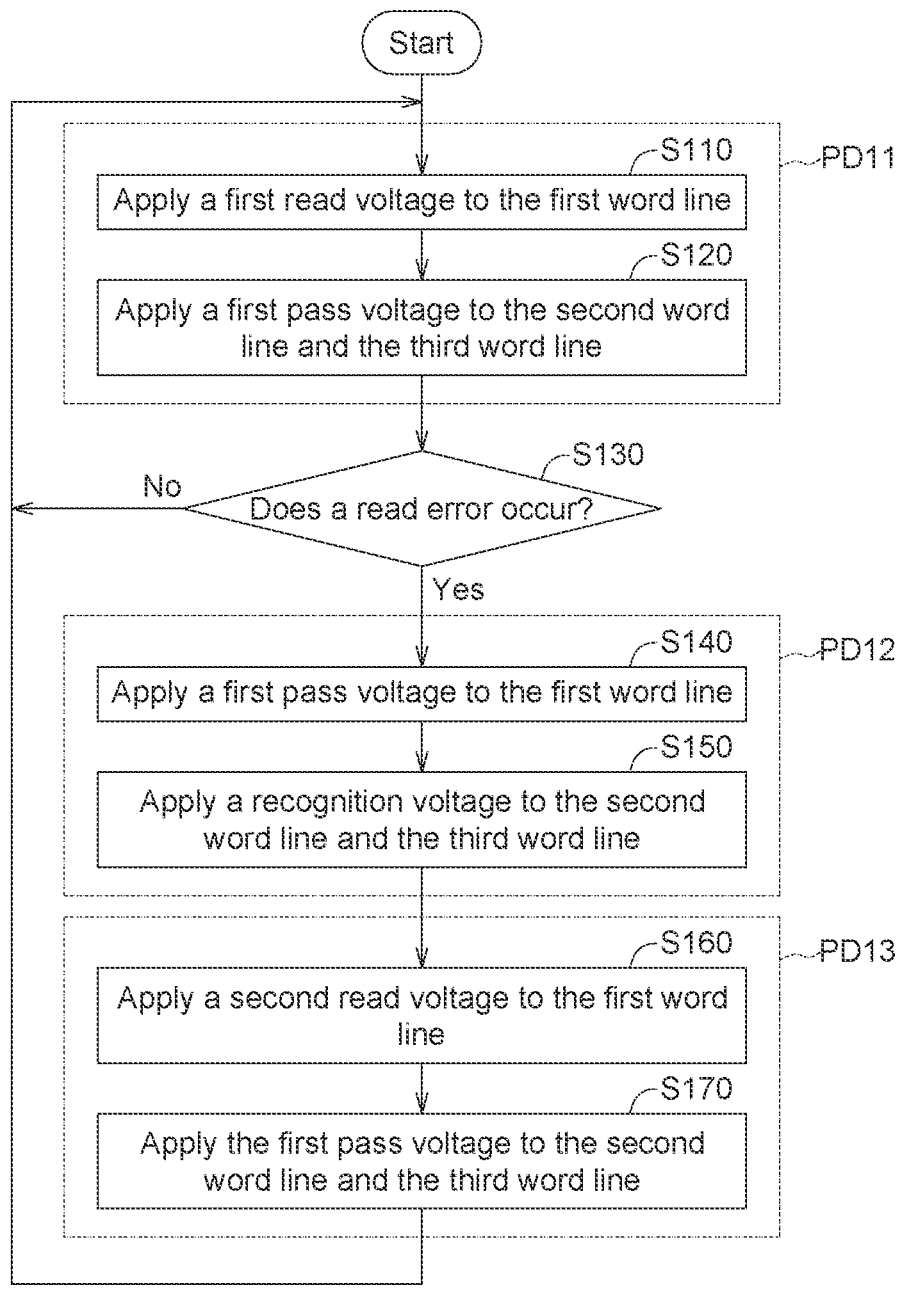
FIG. 5 shows a flowchart of a reading method of the memory device according to an embodiment.

Please refer to FIG. 5, which shows a flowchart of a reading method of the memory device 100 according to an embodiment. The reading method of the memory device 100 of this embodiment includes a read procedure PD11, a recognition procedure PD12 and a re-read procedure PD13.

The read procedure PD11 is used to read the memory cells connected to the first word line WL1 (referred as selected word line). The reading of the memory cells connected to the first word line WL1 may be failed. The read error or fail means that failure bit counts of the memory cells exceeds a predetermined value for specific programming states. The read error can judge whether the error occurs in the high level state group G_H or the low level state group G_L. The threshold voltage shift direction of the threshold voltage distribution curve of the memory cells of the selected first word line WL1 can be determined. In the judgement of the level state group, the read voltage will be recognized whether it belongs to the high level state group G_H or the low level state group G_L. For example, if the read voltage Vread67 is applied to read the memory cells of the sixth programming state P6 and the seventh programming state P7, a read error occurs. The read voltage Vread67 is recognized that it belongs to the high level state group G_H. After retention beyond a time interval from the programming, the threshold voltage distribution curve (shown as a dashed line C1 in FIG. 3) become broadened and shift toward a lower threshold voltage. The recognition procedure PD12 is used to recognize neighboring data patterns of the selected first word line WL1. The re-read procedure PD13 is used to re-read a portion of memory cells (referred as failure memory cells) of the first word line WL1.

The read procedure PD11 includes steps S110 to S120. Please refer to FIG. 6, which illustrates an example of the read procedure PD11. Here, the first word line WL1, the second word line WL2 and the third word line WL3 in the word line WLi as shown in FIG. 1 are taken as examples for illustration. In step S110 of the read procedure PD11, the controlling circuit 130 applies a first read voltage Vread1 to the first word line WL1. The first read voltage Vread1 is, for example, the aforementioned read voltages Vread01, Vread12, Vread23, Vread34, Vread45, Vread56, or Vread67 for different memory states.

Then, in step S120 of the read procedure PD11, the controlling circuit 130 applies a first pass voltage Vpass1 to the second word line WL2 and the third word line WL3. The step S110 and the step S120 of the read procedure PD11 are executed at the same time. In the read procedure PD11, the second word line WL2 and the third word line WL3 are applied with the same first pass voltage Vpass1 to turn on the memory cells connected to the second word line WL2 and the third word line WL3.

In the read procedure PD11, as long as there is no threshold voltage shift in the memory cells, correct data contents can be read correspondingly. However, the memory cells may have a threshold voltage shift due to a long time of use, retention beyond a time interval or an affection by neighboring memory cells.

As previously mentioned in FIG. 1, the memory device 100 includes a plurality of memory strings and each of the memory strings includes a plurality of memory cells connected in series. The memory cells in the same memory string are connected to different word lines (e.g., the first word line WL1, the second word line WL2 and the third word line WL3), respectively. In a same column, the memory cells in the different memory strings are connected to a same word line, for example the first word line WL1 in FIG. 1. The following examples in FIGS. 6, 7, 8, 10, 11, 14, 16, 18, 20, 23 and 24 only illustrate one memory string including three memory cells connected in series for simplification. Each of three memory cells is connected to the second word line WL2, the first word line WL1, and the third word line WL3, respectively.

Figure 6:
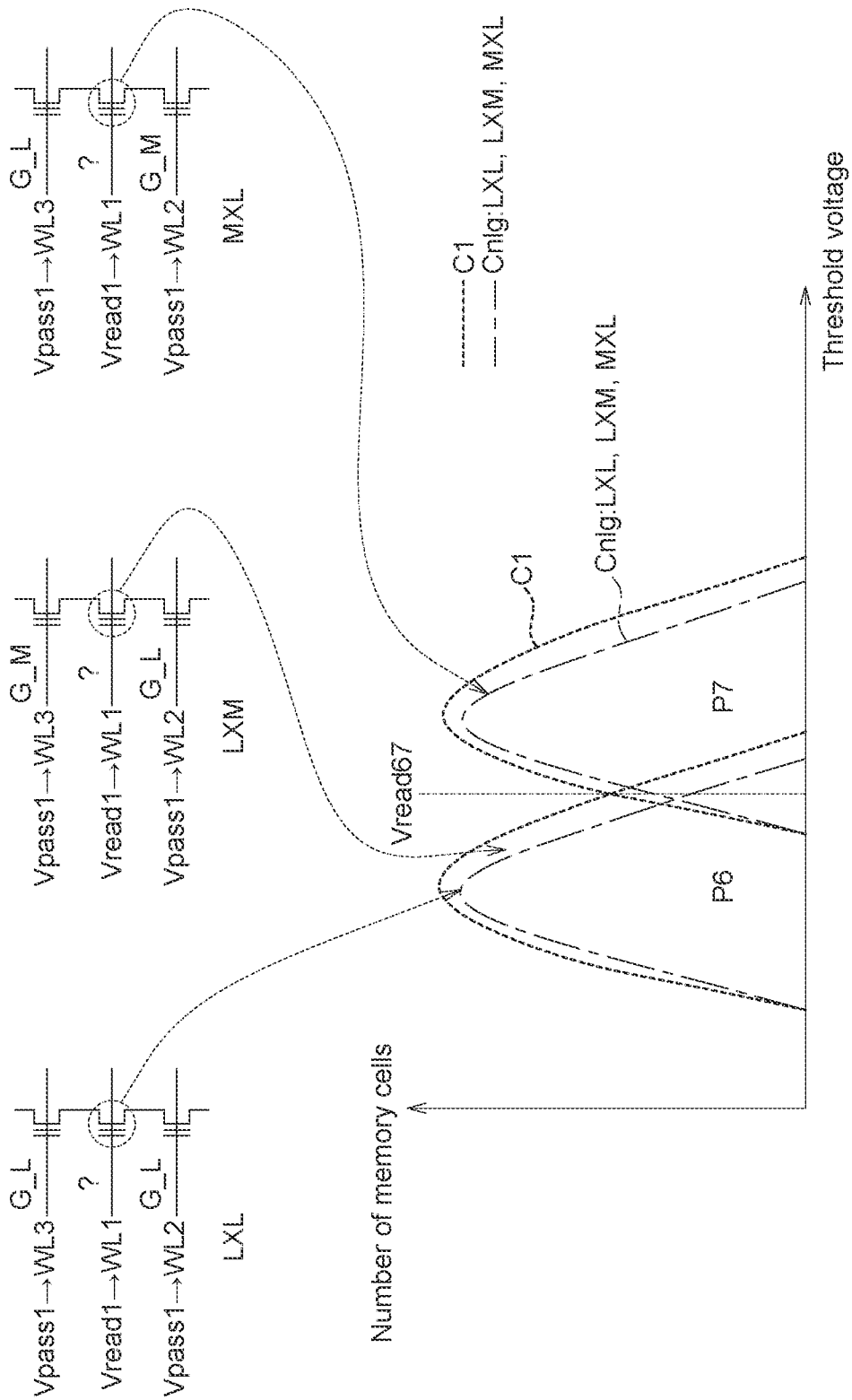
FIG. 6 illustrates an example of a read procedure.

As mentioned in the previous paragraphs, after retention beyond a time interval from the programming, the threshold voltage distribution curve (e.g., a dashed line C1 shown in FIG. 3) of a selected word line (e.g., the first word line WL1) become broadened and a portion of the distribution curve (e.g., a dashed line C1 shown in FIG. 3) of two adjacent program states (e.g., the sixth programming state P6 and the seventh programming state P7 shown in FIG. 3) overlaps. As shown in FIG. 6, the researchers found that, in one embodiment for the sixth programming state P6 and the seventh programming state P7, the threshold voltage distribution curve (shown as the dashed line C1) may be constructed by a neighbor low group curve $C_{nlg}$ shown in FIG. 6 and a neighbor high group curve $C_{nhg}$ shown in FIG. 7. In FIG. 6, one memory string includes three memory cells connected in series and each of three memory cells is connected to the second word line WL2, the first word line WL1, and the third word line WL3, respectively. The neighbor low group curve $C_{nlg}$ represents the memory cells on the selected word line (e.g., the first word line WL1) having the neighboring data patterns among "LXL", "LXM" or "MXL". The "L" stands for the low level state group G_L, the "M" stands for the medium level state group G_M, the above "H" stands for the high level state group G_H, and the "X" stands for any level state group. "LXL" means that the memory cells connected to the second word line WL2, the first word line WL1, and the third word line WL3 are respectively at "the low level state group G_L, any level state group, the low level state group G_L". "LXM", "MXL" are similar, and are not repeated here. The method to recognize the neighboring data patterns will be introduced in the latter recognition procedure PD12.

Figure 7:
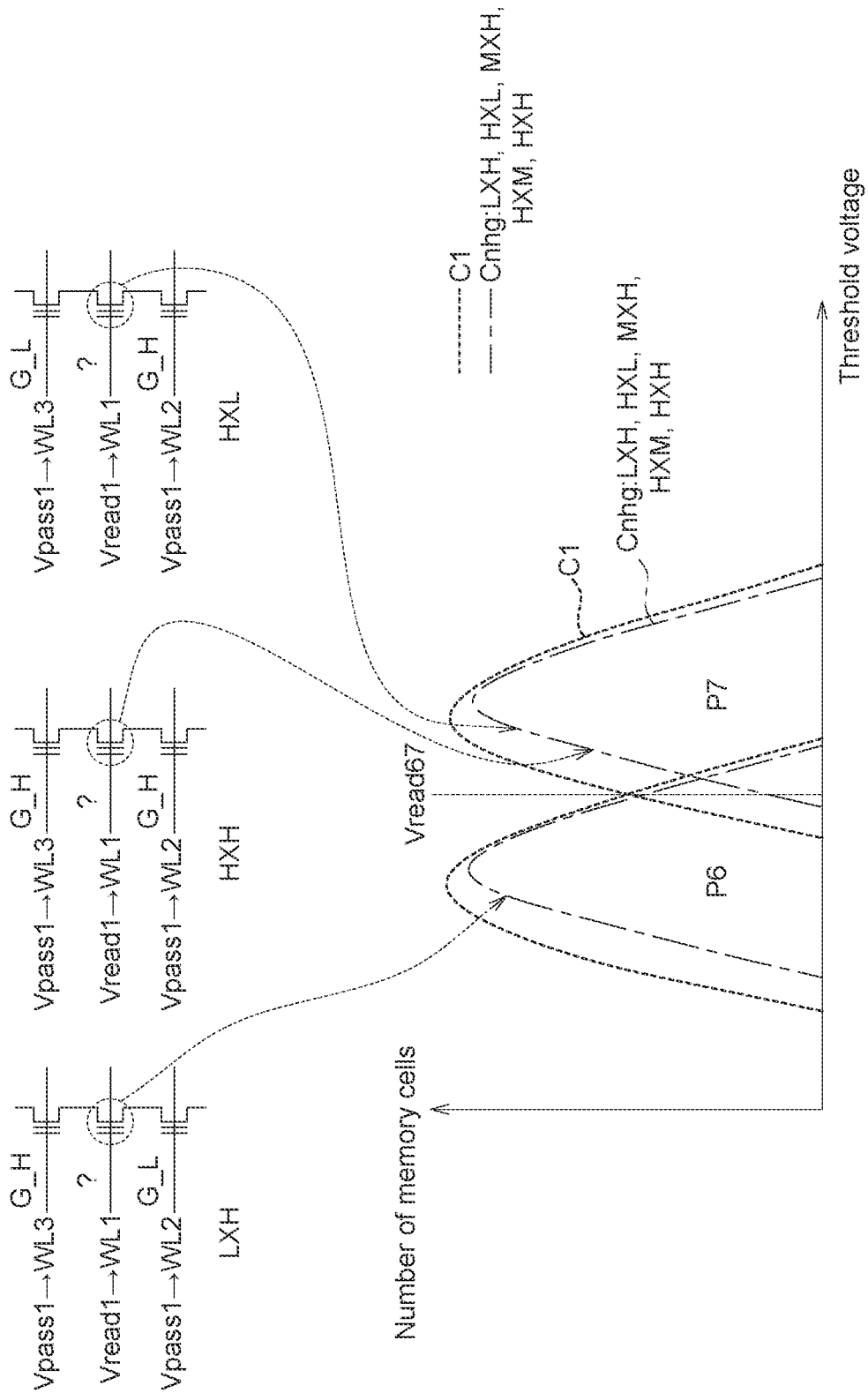
FIG. 7 illustrates another example of the read procedure.

Please refer to FIG. 7, which illustrates another example of the read procedure PD11. Likewise, in one embodiment for the sixth programming state P6 and the seventh programming state P7, the neighbor high group curve $C_{nhg}$ is shown in FIG. 7. In FIG. 7, one memory string includes three memory cells connected in series and each of three memory cells is connected to the second word line WL2, the first word line WL1, and the third word line WL3, respectively. The neighbor high group curve $C_{nhg}$ represents the memory cells on the selected word line (e.g., the first word line WL1) having the neighboring data patterns among "HXH", "LXH", "HXL", "HXM" or "MXH". The threshold voltage distribution curve (shown as the dashed line C1), the neighbor low group curve $C_{nlg}$ and the neighbor high group curve $C_{nhg}$ shown in FIGS. 6 and 7 can be applied to any two adjacent program states of a selected word line, and is not limited to the sixth programming state P6 and the seventh programming state P7.

In the step S130, the controlling circuit 130 determines whether a read error occurs. The read error or fail means that failure bit counts of the memory cells on the selected word line (e.g., the first word line WL1) exceeds a predetermined value for specific programming states. For example, the controlling circuit 130 can determine whether the read error occurs through an error checking operation. The controlling circuit 130 can judge whether the error occurs in the high level state group G_H or the low level state group G_L. The threshold voltage shift direction of the threshold voltage distribution curve of the memory cells of the selected first word line WL1 can be determined. If the read error occurs, the process proceeds to the recognition procedure PD12.

The recognition procedure PD12 includes step S140 and step S150. Please refer to FIG. 8, which illustrates the recognition procedure PD12 according to an embodiment. In the step S140 of the recognition procedure PD12, the controlling circuit 130 applies a first pass voltage Vpass1 to the first word line WL1, so as to turn on the memory cells connected to the first word line WL1.

Figure 8:
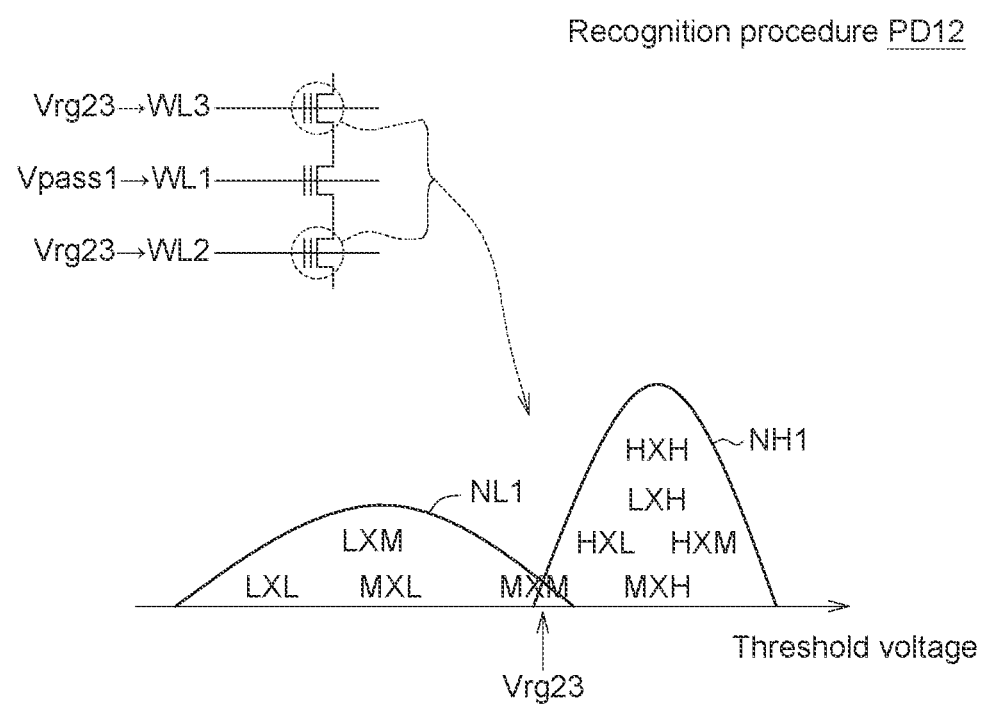
FIG. 8 illustrates a recognition procedure according to an embodiment.

In the step S150 of the recognition procedure PD12, the controlling circuit 130 applies a recognition voltage Vrg23 to the second word line WL2 and the third word line WL3, so as to simultaneously read the memory cells connected to the second word line WL2 and the third word line WL3. As shown in FIG. 8, the memory cell in the second word line WL2 and the memory cell in the third word line WL3 are adjacent to the memory cell in the first word line WL1 in a same memory string. The neighboring data (the data stored in the memory cells of the second word line WL2 and the third word line WL3 respectively) of the selected first word line WL1 can be a low level state group G_L (represented by L) or a high level state group G_H (represented by H). The neighboring data patterns of the selected first word line WL1 can be recognized by the recognition procedure PD12. The neighboring data patterns of the selected first word line WL1 may include a neighboring-low-threshold-voltage group NL1 and a neighboring-high-threshold-voltage group NH1. The neighboring-low-threshold-voltage group NL1 and the neighboring-high-threshold-voltage group NH1 in FIG. 8 will be further explained in the following content.

Figure 9:
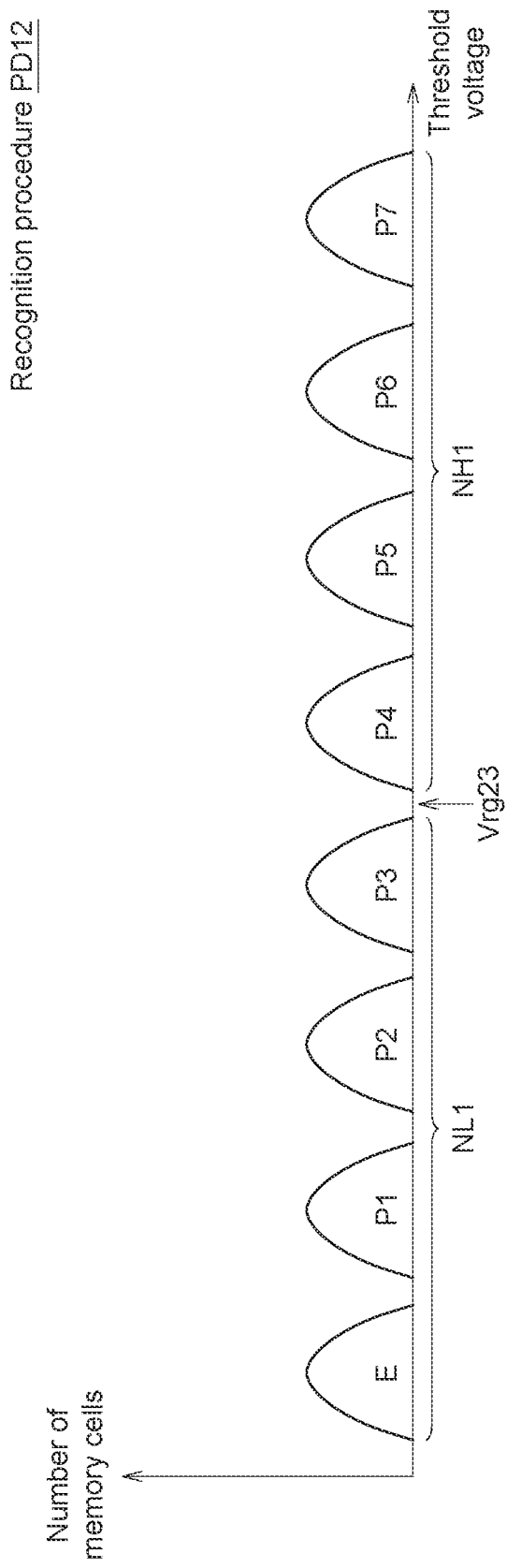
FIG. 9 shows a recognition voltage in FIG. 8 according to an embodiment.

Please refer to FIG. 9, which shows the recognition voltage Vrg23 in FIG. 8 according to an embodiment. In one embodiment, the recognition voltage Vrg23 is the voltage value at the middle point of all the level states (or memory states), for example between the third programming state P3 and the fourth programming state P4 of the memory cells on the second word line WL2 and the third word line WL3. In another embodiment, the recognition voltage Vrg23 is between the fifth programming state P5 and the sixth programming state P6 of the memory cells on the second word line WL2 and the third word line WL3. The value of the recognition voltage Vrg23 is not used to limit the present invention. As shown in FIG. 8, through the recognition voltage Vrg23, the neighboring-low-threshold-voltage group NL1 and the neighboring-high-threshold-voltage group NH1 can be distinguished. In at least one embodiment shown in FIG. 9, the erase state E, the first programming state P1, the second programming state P2, the third programming state P3 of the memory cells on the second word line WL2 and the third word line WL3 are in the low level state group G_L (represented by L). Since the neighboring data (the data stored in the memory cells of the second word line WL2 and the third word line WL3 respectively) of the selected first word line WL1 are in the low level state group G_L, these programming states may be grouped into the neighboring-low-threshold-voltage group NL1. The fourth programming state P4, the fifth programming state P5, the sixth programming state P6, the seventh programming state P7 of the memory cells on the second word line WL2 and the third word line WL3 are in the high level state group G_H (represented by H). Therefore, these programming states may be grouped into the neighboring-high-threshold-voltage group NH1.

Referring back to FIG. 8, in the neighboring-low-threshold-voltage group NL1, the memory cells connected to the second word line WL2, the first word line WL1 and the third word line are at "LXL", "LXM" and "MXL". In "LXL", "LXM" and "MXL", none of the memory cells connected to the second word line WL2 and/or the third word line WL3 being "the high level state group G_H" belong to the neighboring-low-threshold-voltage group NL1. In the neighboring-high-threshold-voltage group NH1, the memory cells connected to the second word line WL2, the first word line WL1, the third word line WL3 located at "HXH", "LXH", "HXL", "HXM" and "MXH". In "HXH", "LXH", "HXL", "HXM" and "MXH", at least one memory cell connected to the second word line WL2 and/or the third word line WL3 being "the high level state group G_H" belong to the neighboring-high-threshold-voltage group NH1.

Through applying the recognition voltage Vrg23 to the second word line WL2 and the third word line WL3, the neighboring data patterns, i.e. the neighboring-high-threshold-voltage group NH1 and/or the neighboring-low-threshold-voltage group NL1 are recognized.

After the recognition procedure PD12, the process proceeds to the re-read procedure PD13. The re-read procedure PD13 includes steps S160 to S170.

Figure 10:
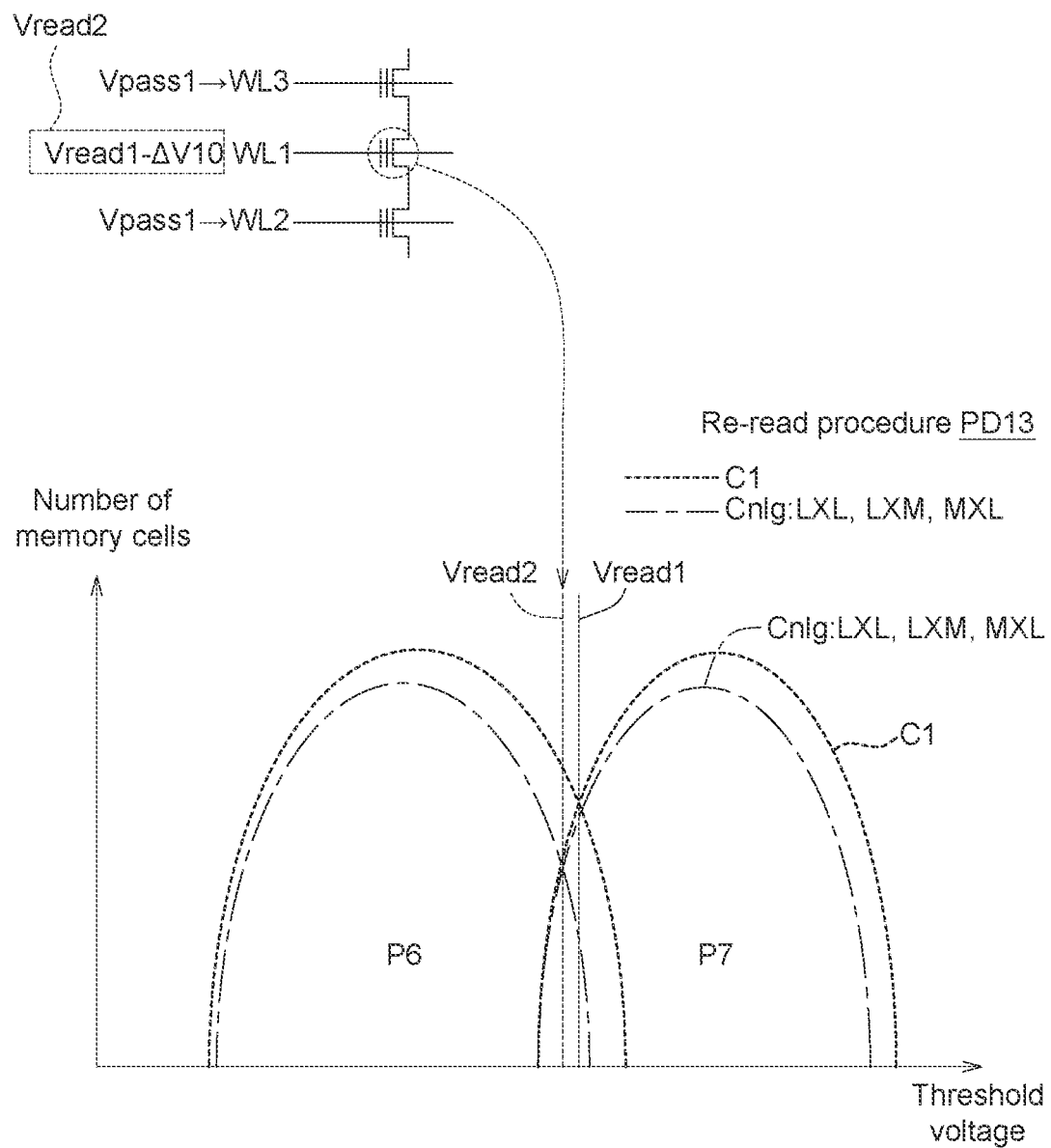
FIG. 10 illustrates a re-read procedure according to an embodiment.

FIG. 10 illustrates the re-read procedure PD13 according to one embodiment. As previously mentioned, the first read voltage Vread1 (e.g., the read voltage Vread67 shown in FIG. 2) is recognized that it belongs to read the memory cells in the high level state group G_H (e.g., the sixth programming state P6 and the seventh programming state P7). After retention beyond a time interval from the programming, the threshold voltage distribution curve (shown as a dashed line C1) become broadened and shift toward a lower threshold voltage (as shown in FIG. 3). In the step S160 of the re-read procedure PD13, the controlling circuit 130 applies a second read voltage Vread2 to the first word line WL1. The second read voltage Vread2 is lower than the first read voltage Vread1 (e.g., the read voltage Vread67). The second read voltage Vread2 only read the memory cells on the neighbor low group curve $C_{nlg}$ on the selected word line (e.g., the first word line WL1) having the neighboring data patterns among "LXL", "LXM" or "MXL". The second read voltage Vread2 does not read all memory cells (which are on the dashed line C1) on the selected word line (e.g., the first word line WL1). For example, the second read voltage Vread2 equals to the first read voltage Vread1 minus an adjusting voltage ΔV10. The adjusting voltage ΔV10 is larger than zero.

Next, in the step S170 of the re-read procedure PD13, the controlling circuit 130 applies the first pass voltage Vpass1 to the second word line WL2 and the third word line WL3. The step S160 and the step S170 of the re-read procedure PD13 are executed simultaneously. In the re-read procedure PD13, the second word line WL2 and the third word line WL3 are applied with the same first pass voltage Vpass1 to turn on the memory cells connected to the second word line WL2 and the third word line WL3.

As shown in FIG. 10, the memory cells on the neighbor low group curve $C_{nlg}$ are less than the memory cells on the dashed line C1. The re-read procedure PD13 is effectively improved and the probability of the read errors is also reduced.

Figure 11:
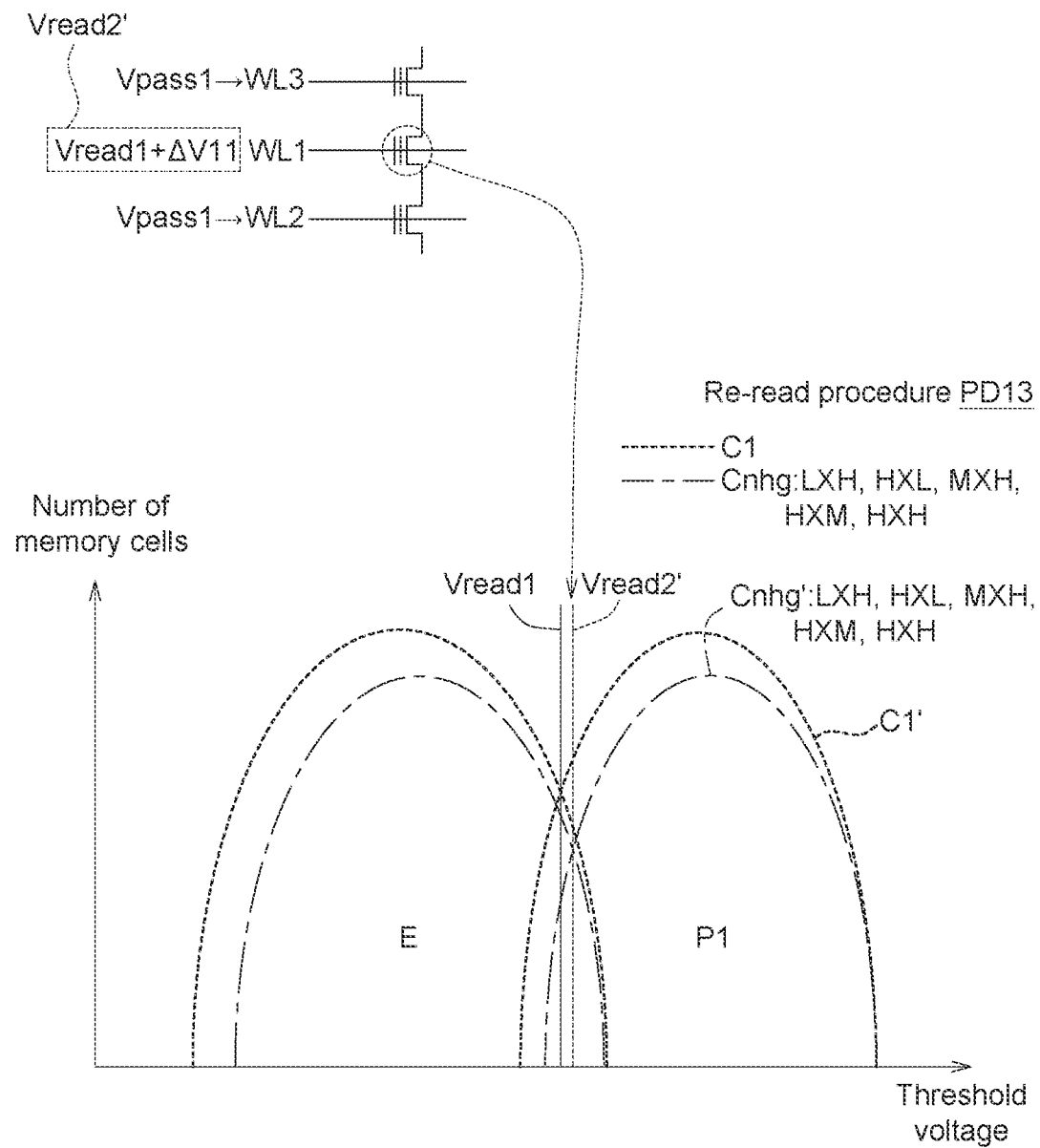
FIG. 11 illustrates a re-read procedure according to another embodiment.

FIG. 11 illustrates the re-read procedure PD13 according to another embodiment. In the step S160 of the re-read procedure PD13 according to the embodiment of FIG. 11, the controlling circuit 130 applies a second read voltage Vread2' to the first word line WL1. The second read voltage Vread2' is higher than the first read voltage Vread1. For example, the second read voltage Vread2' equals to the first read voltage Vread1 plus an adjusting voltage ΔV11. The adjusting voltage ΔV11 is larger than zero.

Next, in the step S170 of the re-read procedure PD13, the controlling circuit 130 applies the first pass voltage Vpass1 to the second word line WL2 and the third word line WL3. The step S160 and the step S170 of the re-read procedure PD13 are executed simultaneously. In the re-read procedure PD13, the second word line WL2 and the third word line WL3 are applied with the same first pass voltage Vpass1 to turn on the memory cells connected to the second word line WL2 and the third word line WL3.

As shown in FIG. 11, in this embodiment, the read voltage Vread1 (e.g., the first read voltage Vread01 shown in FIG. 2) is recognized that it belongs to read the memory cells in the low level state group G_L (e.g., the erase state E and the first programming state P1). After retention beyond a time interval from the programming, the threshold voltage distribution curve (shown as a dashed line C1') become broadened and shift toward a high threshold voltage (as shown in FIG. 4). The second read voltage Vread2' only read the memory cells on the neighbor high group curve $C_{nhg}'$ on the selected word line (e.g., the first word line WL1) having the neighboring data patterns among "LXH", "HXL", "MXH", "HXM" or "HXH". The second read voltage Vread2' does not read all memory cells (which are on the dashed line C1') on the selected word line (e.g., the first word line WL1) As shown in FIG. 11, the memory cells on the neighbor high group curve $C_{nhg}'$ are less than the memory cells on the dashed line C1'. The re-read procedure PD13 is effectively improved and the probability of the read errors is also reduced.

Through the above embodiments, after the controlling circuit 130 reads the memory cells on the memory device 100. If a read error occurs on the memory cells of the selected word line (e.g., the first word line WL1), the controlling circuit 130 recognizes the read voltage of the level state, and determines the read occurs in the high level state group G_H or the low level state group G_L. After determining the read error occurring in the high level state group G_H or the low level state group G_L, the threshold voltage distribution curve of the memory cells of the specific level state group after retention can be evaluated to shift toward a lower threshold voltage or a higher threshold voltage. Then, the controlling circuit 130 recognizes the neighboring data pattern, i.e. the neighboring-high-threshold-voltage group NH1 or the neighboring-low-threshold-voltage group NL1 for the memory cells of the selected (or failure) word line (e.g., the first word line WL1). Then, the controlling circuit 130 executes a re-read procedure for a portion of the memory cells on the selected word line (e.g., the first word line WL1), so as to improve the reading efficiency and increase the reading accuracy.

Figure 12:
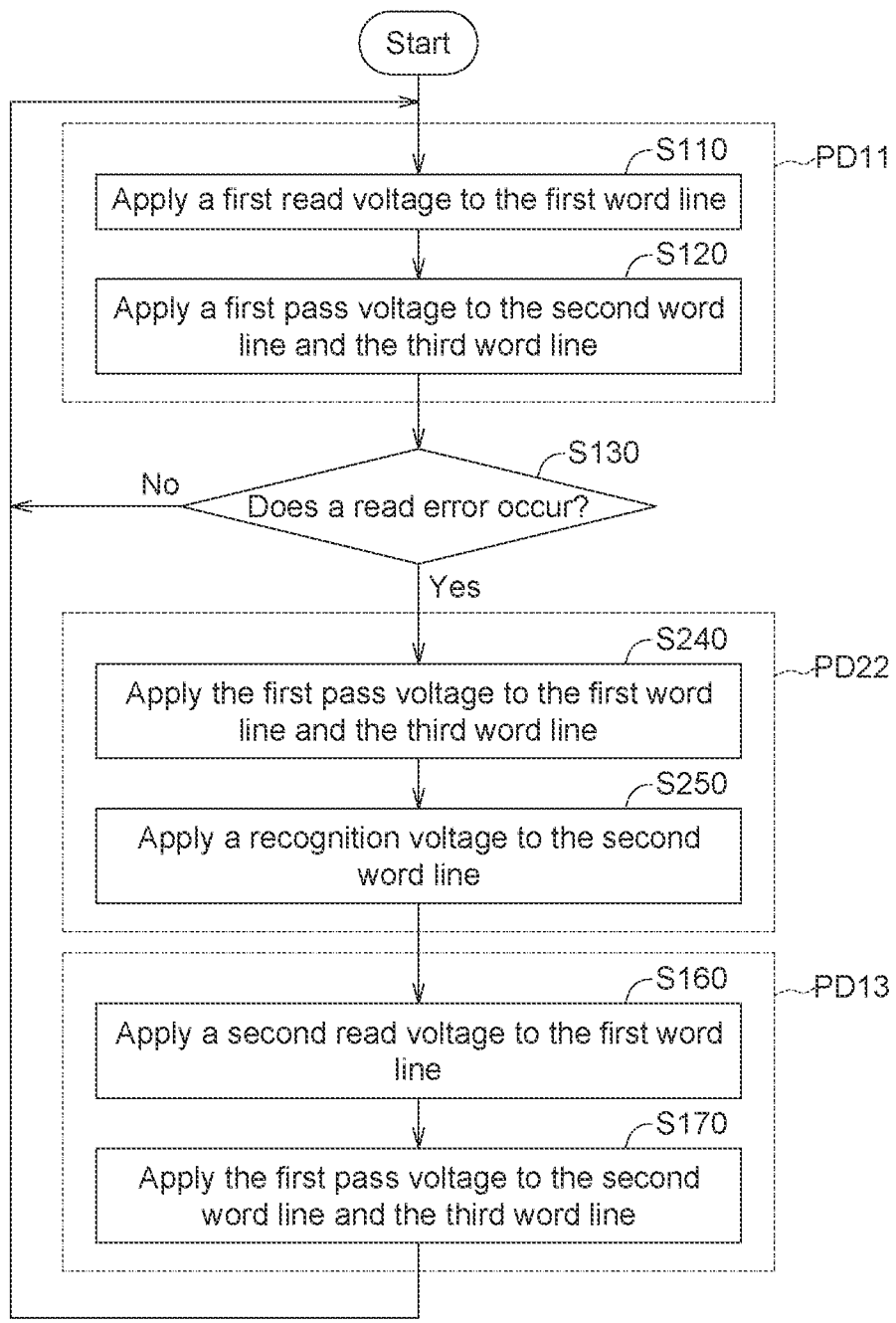
FIG. 12 shows a flow chart of a reading method for the memory device according to another embodiment.

The recognition procedure PD12 for recognizing the neighboring data pattern and the threshold voltage shift can be implemented in different implementations. Please refer to FIG. 12, which shows a flow chart of a reading method for the memory device 100 according to another embodiment. The recognition procedure PD22 includes step S240 and step S250. Please refer to FIG. 13, which illustrates the recognition procedure PD22 according to another embodiment. In the step S240 of the recognition procedure PD22, the controlling circuit 130 applies the first pass voltage Vpass1 to the first word line WL1 and the third word line WL3, so as to turn on the memory cells connected to the first word line WL1 and the third word line WL3.

In the step S250 of the recognition procedure PD22, the controlling circuit 130 applies a recognition voltage Vrg2 to the second word line WL2 to read the memory cell connected to the second word line WL2. As shown in FIG. 13, the memory cell in the second word line WL2 and the memory cell in the third word line WL3 are adjacent to the memory cell in the first word line WL1 in a same memory string. The neighboring data (the data stored in the memory cells of the second word line WL2 and the third word line WL3 respectively) of the selected first word line WL1 can be a low level state group G_L (represented by L) or a high level state group G_H (represented by H). The neighboring data patterns of the selected first word line WL1 can be recognized by the recognition procedure PD22. The neighboring data patterns of the selected first word line WL1 may include a neighboring-low-threshold-voltage group NL2 and a neighboring-high-threshold-voltage group NH2. The neighboring-low-threshold-voltage group NL2 and the neighboring-high-threshold-voltage group NH2 in FIG. 13 will be further explained in the following content.

Please refer to FIG. 14, which shows the recognition voltage Vrg2 in FIG. 13 according to another embodiment. In one embodiment, the recognition voltage Vrg2 is between the fifth programming state P5 and the sixth programming state P6 of the memory cells on the second word line WL2. The value of the recognition voltage Vrg2 is not used to limit the present invention. As shown in FIG. 13, through the recognition voltage Vrg2, a neighboring-low-threshold-voltage group NL2 and a neighboring-high-threshold-voltage group NH2 can be distinguished. In at least one embodiment shown in FIG. 14, the erase state E, the first programming state P1, the second programming state P2, the third programming state P3, the fourth programming state P4, the fifth programming state P5 of the memory cells on the second word line WL2 are in the low level state group G_L (represented by L) or the medium level state group G_M (represented by M). These programming states may be grouped into the neighboring-low-threshold-voltage group NL2. The sixth programming state P6, the seventh programming state P7 of the memory cells on the second word line WL2 are in the high level state group G_H (represented by H). These programming states may be grouped into the neighboring-high-threshold-voltage group NH2.

Referring back to FIG. 13, in the neighboring-low-threshold-voltage group NL2, the memory cells connected to the second word line WL2, the first word line WL1, the third word line WL3 are at "LXL", "LXM", "LXH", "MXL", "MXM", "MXH". In "LXL", "LXM", "LXH", "MXL", "MXM", "MXH", the memory cell connected to the second word line WL2 being "the low level state group G_L" or "the medium level state group G_M" belongs to the neighboring-low-threshold-voltage group NL2. In the neighboring-high-threshold-voltage group NH2, the memory cells connected to the second word line WL2, the first word line WL1, the third word line WL3 are at "HXL", "HXM", "HXH". In "HXL" "HXM", "HXH", the memory cell connected to the second word line WL2 being "the high level state group G_H" belongs to the neighboring-high-threshold-voltage group NH2.

Through applying the recognition voltage Vrg2 to the second word line WL2, the neighboring data patterns, i.e. the neighboring-high-threshold-voltage group NH2 and/or the neighboring-low-threshold-voltage group NL2 are recognized. After the recognition procedure PD22, the process proceeds to the re-read procedure PD13.

Figure 15:
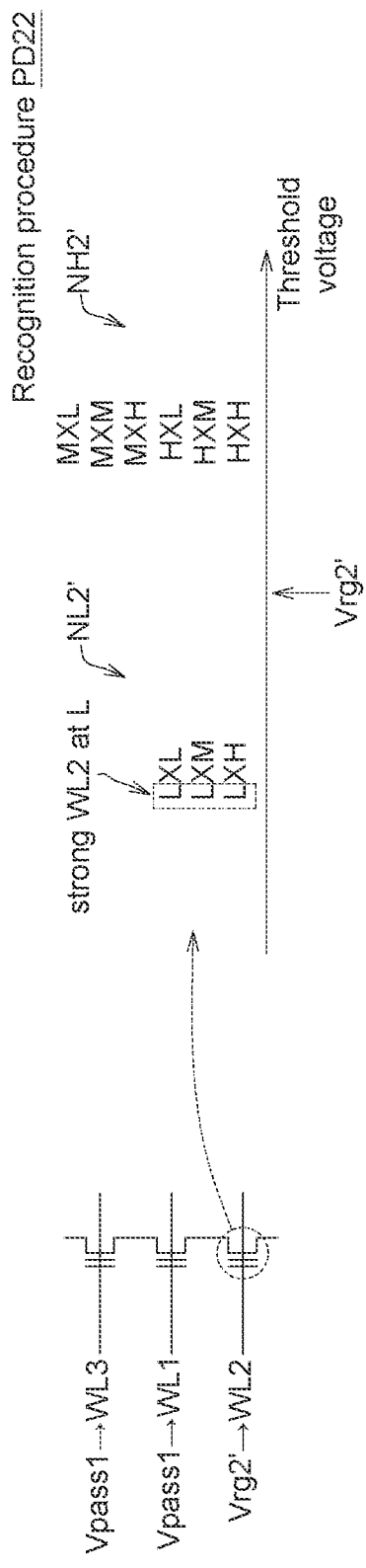
FIG. 15 illustrates the recognition procedure according to another embodiment.

Please refer to FIG. 15, which illustrates the recognition procedure PD22 according to another embodiment. In the step S240 of the recognition procedure PD22, the controlling circuit 130 applies the first pass voltage Vpass1 to the first word line WL1 and the third word line WL3, so as to turn on the memory cells connected to the first word line WL1 and the third word line WL3.

In the step S250 of the recognition procedure PD22, the controlling circuit 130 applies a recognition voltage Vrg2' to the second word line WL2 to read the memory cell connected to the second word line WL2. As shown in FIG. 15, the memory cell in the second word line WL2 and the memory cell in the third word line WL3 are adjacent to the memory cell in the first word line WL1 in a same memory string. The neighboring data (the data stored in the memory cells of the second word line WL2 and the third word line WL3 respectively) of the selected first word line WL1 can be a low level state group G_L (represented by L) or a high level state group G_H (represented by H). The neighboring data patterns of the selected first word line WL1 can be recognized by the recognition procedure PD22. The neighboring data patterns of the selected first word line WL1 may include a neighboring-low-threshold-voltage group NL2' and a neighboring-high-threshold-voltage group NH2'. The neighboring-low-threshold-voltage group NL2' and the neighboring-high-threshold-voltage group NH2' in FIG. 15 will be further explained in the following content.

Figure 16:
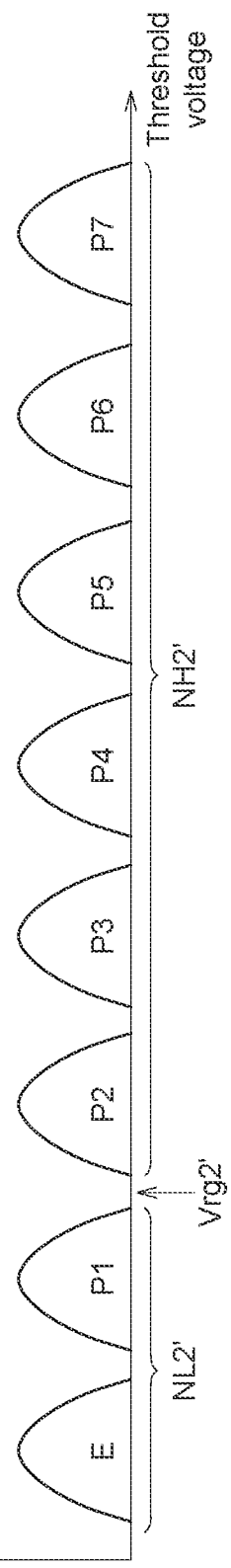
FIG. 16 shows the recognition voltage in FIG. 15 according to another embodiment.

Please refer to FIG. 16, which shows the recognition voltage Vrg2' in FIG. 15 according to another embodiment. In one embodiment, the recognition voltage Vrg2' is between the first programming state P1 and the second programming state P2 of the memory cells on the second word line WL2. The value of the recognition voltage Vrg2' is not used to limit the present invention. As shown in FIG. 15, through the recognition voltage Vrg2', a neighboring-low-threshold-voltage group NL2' and a neighboring-high-threshold-voltage group NH2' can be distinguished. In at least one embodiment shown in FIG. 16, the erase state E, the first programming state P1 of the memory cells on the second word line WL2 are in the low level state group G_L (represented by L). These programming states may be grouped into the neighboring-low-threshold-voltage group NL2'. The second programming state P2, the third programming state P3, the fourth programming state P4, the fifth programming state P5, the sixth programming state P6, the seventh programming state P7 of the memory cells on the second word line WL2 are in the high level state group G_H (represented by H) or the medium level state group G_M (represented by M). These programming states may be grouped into the neighboring-high-threshold-voltage group NH2'.

Referring back to FIG. 15, in the neighboring-low-threshold-voltage group NL2', the memory cells connected to the second word line WL2, the first word line WL1, the third word line WL3 are at "LXL", "LXM", and "LXH". In "LXL", "LXM", and "LXH", the memory cell connected to the second word line WL2 being "the low level state group G_L" belongs to the neighboring-low-threshold-voltage group NL2'. In the neighboring-high-threshold-voltage group NH2', the memory cells connected to the second word line WL2, the first word line WL1, the third word line WL3 are at "MXL", "MXM", "MXH", "HXL", "HXM", "HXH". In "MXL", "MXM", "MXH", "HXL", "HXM", "HXH", the memory cell connected to the second word line WL2 being "the high level state group G_H" or "the medium level state group G_M" belongs to the neighboring-high-threshold-voltage group NH2'.

Through applying the recognition voltage Vrg2' to the second word line WL2, the neighboring data patterns, i.e. the neighboring-high-threshold-voltage group NH2' and/or the neighboring-low-threshold-voltage group NL2' are recognized. After the recognition procedure PD22, the process proceeds to the re-read procedure PD13.

Figure 17:
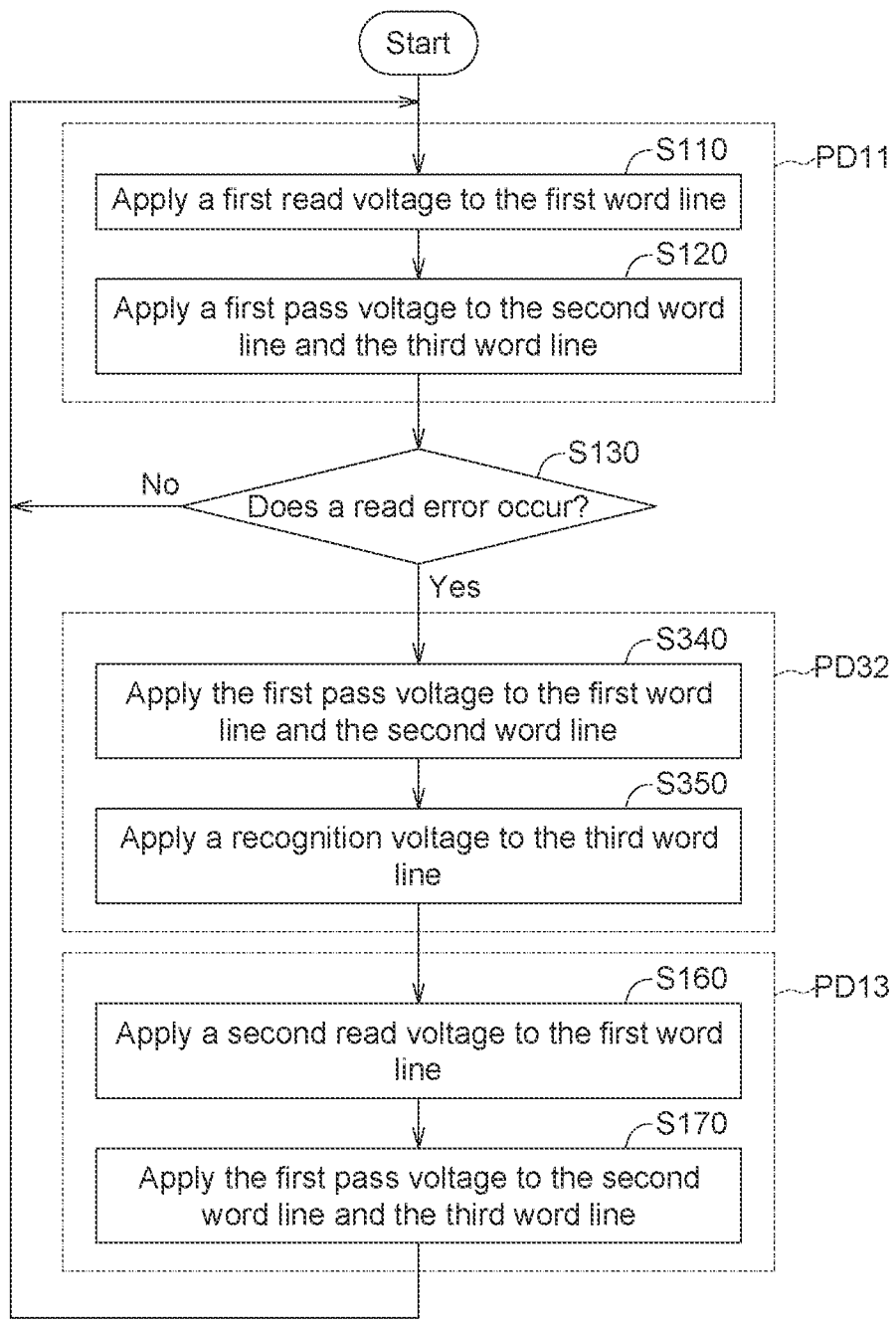
FIG. 17 shows a flowchart of a reading method of the memory device according to another embodiment.

The recognition procedures PD12 and P22 for recognizing the neighboring data pattern and the threshold voltage shift can be implemented in different implementations. Please refer to FIG. 17, which shows a flowchart of a reading method of the memory device 100 according to another embodiment. The recognition procedure PD32 includes step S340 and step S350. Please refer to FIG. 18, which illustrates the recognition procedure PD32 according to another embodiment. In the step S340 of the recognition procedure PD32, the controlling circuit 130 applies the first pass voltage Vpass1 to the first word line WL1 and the second word line WL2, so as to turn on the memory cells connected to the first word line WL1 and the second word line WL2.

In step S350 of the recognition procedure PD32, the controlling circuit 130 applies a recognition voltage Vrg3 to the third word line WL3 to read the memory cell connected to the third word line WL3. As shown in FIG. 18, the memory cell in the second word line WL2 and the memory cell in the third word line WL3 are adjacent to the memory cell in the first word line WL1 in a same memory string. The neighboring data (the data stored in the memory cells of the second word line WL2 and the third word line WL3 respectively) of the selected first word line WL1 can be a low level state group G_L (represented by L) or a high level state group G_H (represented by H). The neighboring data patterns of the selected first word line WL1 can be recognized by the recognition procedure PD32. The neighboring data patterns of the selected first word line WL1 may include a neighboring-low-threshold-voltage group NL3 and a neighboring-high-threshold-voltage group NH3. The neighboring-low-threshold-voltage group NL3 and the neighboring-high-threshold-voltage group NH3 in FIG. 18 will be further explained in the following content.

Please refer to FIG. 19, which shows the recognition voltage Vrg3 in FIG. 18 according to another embodiment. In one embodiment, the recognition voltage Vrg3 is between the fifth programming state P5 and the sixth programming state P6 of the memory cells on the third word line WL3. The value of the recognition voltage Vrg3 is not used to limit the present invention. As shown in FIG. 18, through the recognition voltage Vrg3, a neighboring-low-threshold-voltage group NL3 and a neighboring-high-threshold-voltage group NH3 can be distinguished. In at least one embodiment shown in FIG. 19, the erase state E, the first programming state P1, the second programming state P2, the third programming state P3, the fourth programming state P4, the fifth programming state P5 of the memory cells on the third word line WL3 are in the low level state group G_L (represented by L) or the medium level state group G_M (represented by M). These programming states may be grouped into the neighboring-low-threshold-voltage group NL3. The sixth programming state P6, the seventh programming state P7 of the memory cells on the third word line WL3 are in the high level state group G_H (represented by H). These programming states may be grouped into the neighboring-high-threshold-voltage group NH3.

Referring back to FIG. 18, in the neighboring-low-threshold-voltage group NL3, the memory cells connected to the second word line WL2, the first word line WL1, the third word line WL3 are at "LXL", "MXL", "HXL", "LXM", "MXM", "HXM". In "LXL", "MXL", "HXL", "LXM", "MXM", "HXM", the memory cell connected to the third word line WL3 being "the low level state group G_L" or "the medium level state group G_M" belongs to the neighboring-low-threshold-voltage group NL3. In the neighboring-high-threshold-voltage group NH3, the memory cells connected to the second word line WL2, the first word line WL1, the third word line WL3 are at "LXH", "MXH", "HXH". In "LXH", "MXH", "HXH", the memory cell connected to the third word line WL3 being "the high level state group G_H" belong to the neighboring-high-threshold-voltage group NH3.

Through applying the recognition voltage Vrg3 to the third word line WL3, the neighboring data patterns, i.e. the neighboring-high-threshold-voltage group NH3 and/or the neighboring-low-threshold-voltage group NL3 are recognized. After the recognition procedure PD32, the process proceeds to the re-read procedure PD13.

Figure 20:
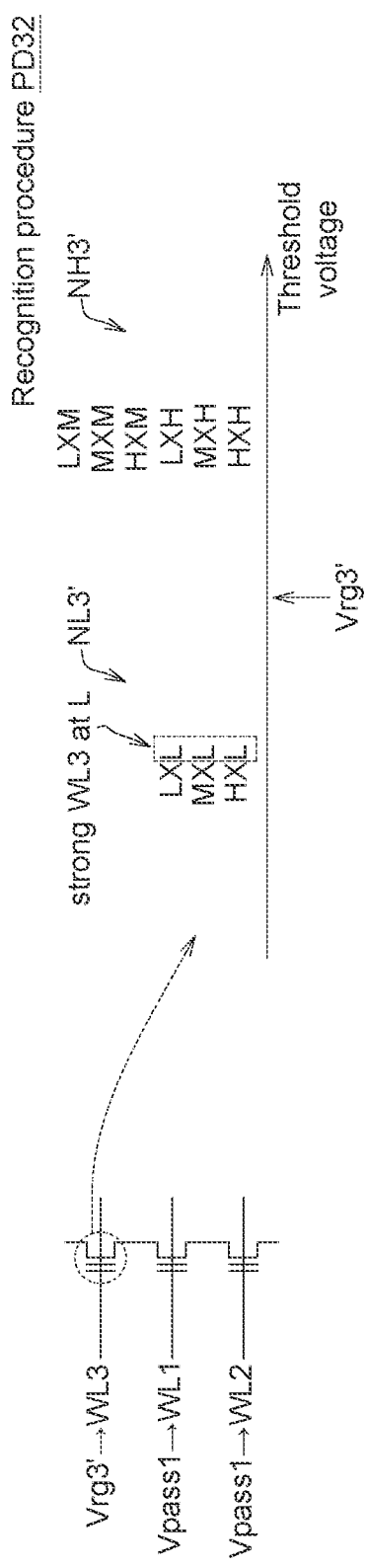
FIG. 20 illustrates the recognition procedure according to another embodiment.

Please refer to FIG. 20, which illustrates the recognition procedure PD32 according to another embodiment. In the step S340 of the recognition procedure PD32, the controlling circuit 130 applies the first pass voltage Vpass1 to the first word line WL1 and the second word line WL2, so as to turn on the memory cells connected to the first word line WL1 and the second word line WL2.

In step S350 of the recognition procedure PD32, the controlling circuit 130 applies a recognition voltage Vrg3' to the third word line WL3 to read the memory cell connected to the third word line WL3. As shown in FIG. 20, the memory cell in the second word line WL2 and the memory cell in the third word line WL3 are adjacent to the memory cell in the first word line WL1 in a same memory string. The neighboring data (the data stored in the memory cells of the second word line WL2 and the third word line WL3 respectively) of the selected first word line WL1 can be a low level state group G_L (represented by L) or a high level state group G_H (represented by H). The neighboring data patterns of the selected first word line WL1 can be recognized by the recognition procedure PD32. The neighboring data patterns of the selected first word line WL1 may include a neighboring-low-threshold-voltage group NL3' and a neighboring-high-threshold-voltage group NH3'. The neighboring-low-threshold-voltage group NL3' and the neighboring-high-threshold-voltage group NH3' in FIG. 20 will be further explained in the following content.

Figure 21:
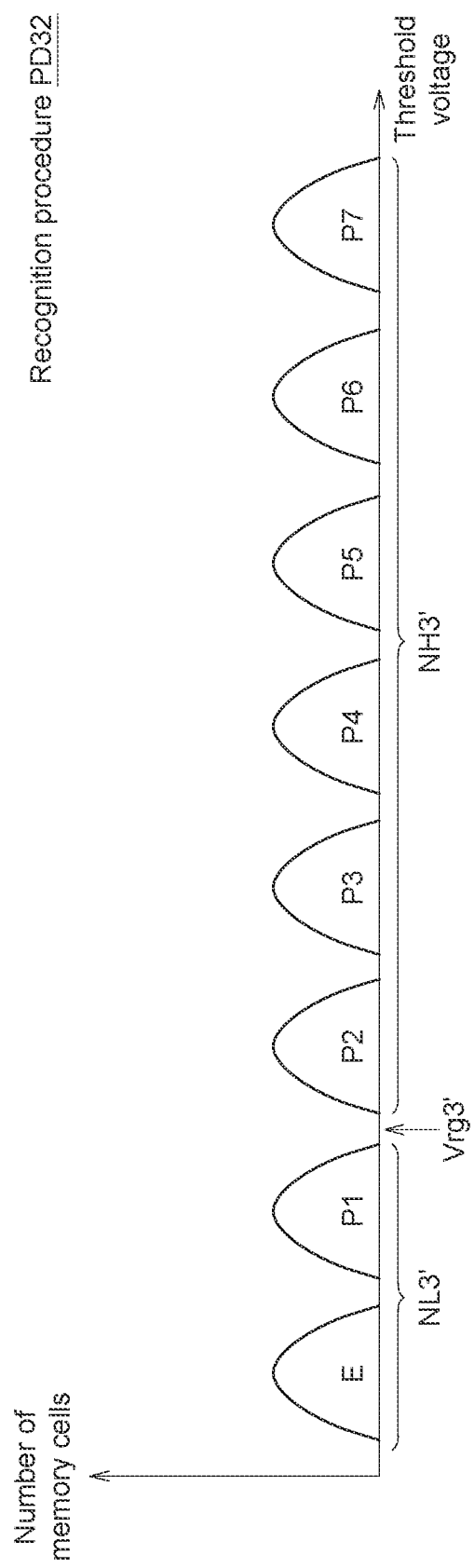
FIG. 21 shows the recognition voltage in FIG. 20 according to another embodiment.

Please refer to FIG. 21, which shows the recognition voltage Vrg3' in FIG. 20 according to another embodiment. In one embodiment, the recognition voltage Vrg3' is between the first programming state P1 and the second programming state P2 of the memory cells on the third word line WL3. The value of the recognition voltage Vrg3' is not used to limit the present invention. As shown in FIG. 20, through recognition voltage Vrg3', a neighboring-low-threshold-voltage group NL3' and a neighboring-high-threshold-voltage group NH3' can be distinguished. In at least one embodiment shown in FIG. 21, the erase state E, the first programming state P1 of the memory cells on the second word line WL2 and the third word line WL3 are in the low level state group G_L (represented by L). These programming states may be grouped into the neighboring-low-threshold-voltage group NL3'. The second programming state P2, the third programming state P3, the fourth programming state P4, the fifth programming state P5, the sixth programming state P6, the seventh programming state P7 of the memory cells on the third word line WL3 are in the high level state group G_H (represented by H) or the medium level state group G_M (represented by M). These programming states may be grouped into the neighboring-high-threshold-voltage group NH3'.

Referring back to FIG. 20, in the neighboring-low-threshold-voltage group NL3', the memory cells connected to the second word line WL2, the first word line WL1, the third word line WL3 are at "LXL", "MXL", "HXL". In "LXL", "MXL", "HXL", the memory cell connected to the third word line WL3 being "the low level state group G_L" belongs to the neighboring-low-threshold-voltage group NL3'. In the neighboring-high-threshold-voltage group NH2', the memory cells connected to the second word line WL2, the first word line WL1, the third word line WL3 are at "LXM", "MXM", "HXM", "LXH", "MXH", "HXH". In "LXM", "MXM", "HXM", "LXH", "MXH", "HXH", the memory cell connected to the third word line WL3 beings "the high level state group G_H" or "the medium level state group G_M" belongs to the neighboring-high-threshold-voltage group NH3'.

Through applying the recognition voltage Vrg3' to the third word line WL3, the neighboring data patterns, i.e. the neighboring-high-threshold-voltage group NH3' and/or the neighboring-low-threshold-voltage group NL3' are recognized. After the recognition procedure PD32, the process proceeds to the re-read procedure PD13.

Figure 22:
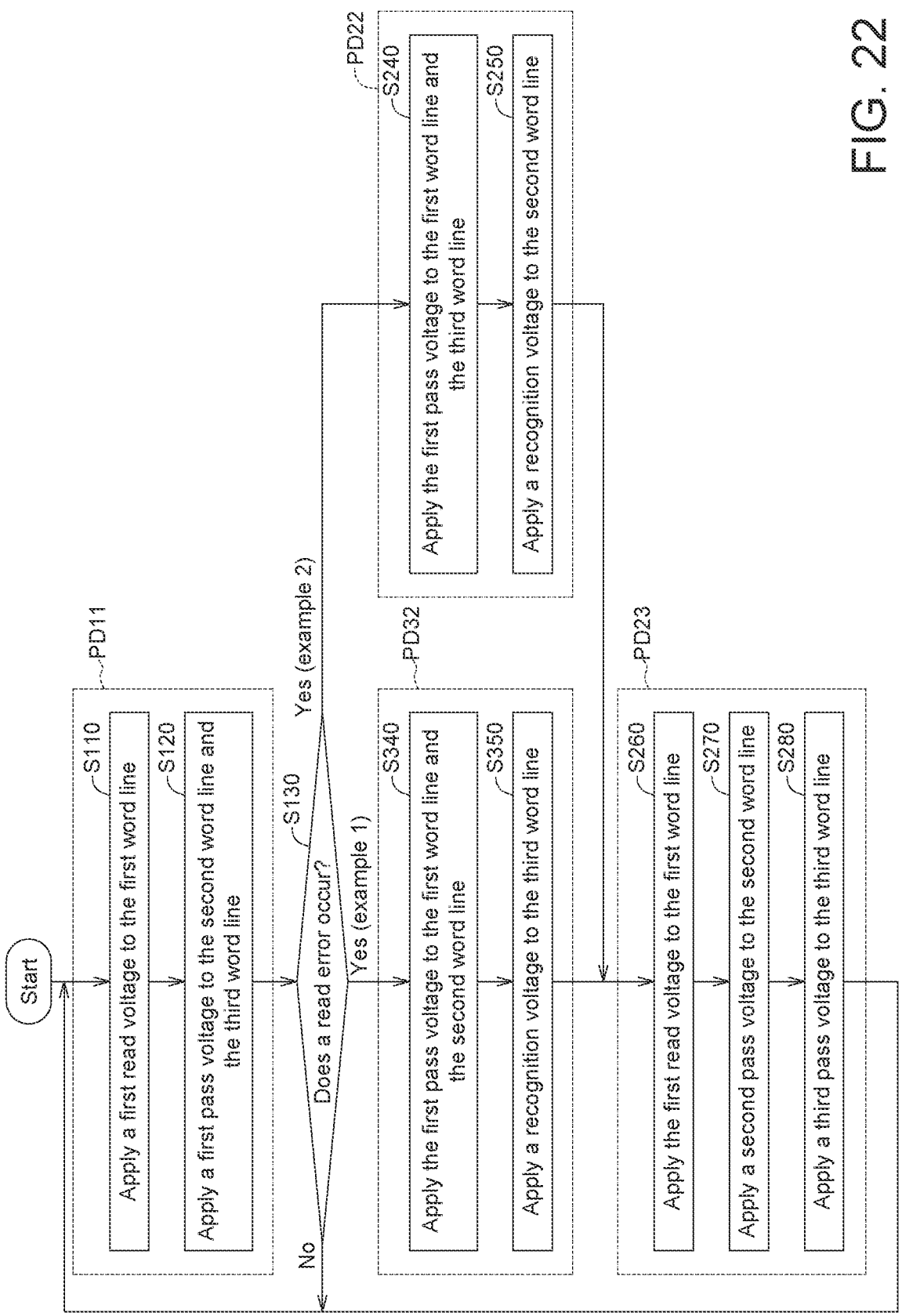
FIG. 22 shows a flow chart of the reading method of the memory device according to another embodiment.

The re-read procedure PD13 for re-reading the memory cell can be executed in another embodiment. Please refer to FIG. 22, which shows a flow chart of the reading method of the memory device 100 according to another embodiment. In the embodiment shown in the FIG. 22, the recognition procedure PD32 is used for recognizing the neighboring data pattern and the threshold voltage shift. In another embodiment, the recognition procedure PD32 could be replaced by the recognition procedure PD12 of the FIG. 5 or the recognition procedure PD22 of the FIG. 12. In the FIG. 22, the re-read procedure P23 includes steps S260 to S280.

Figure 23:
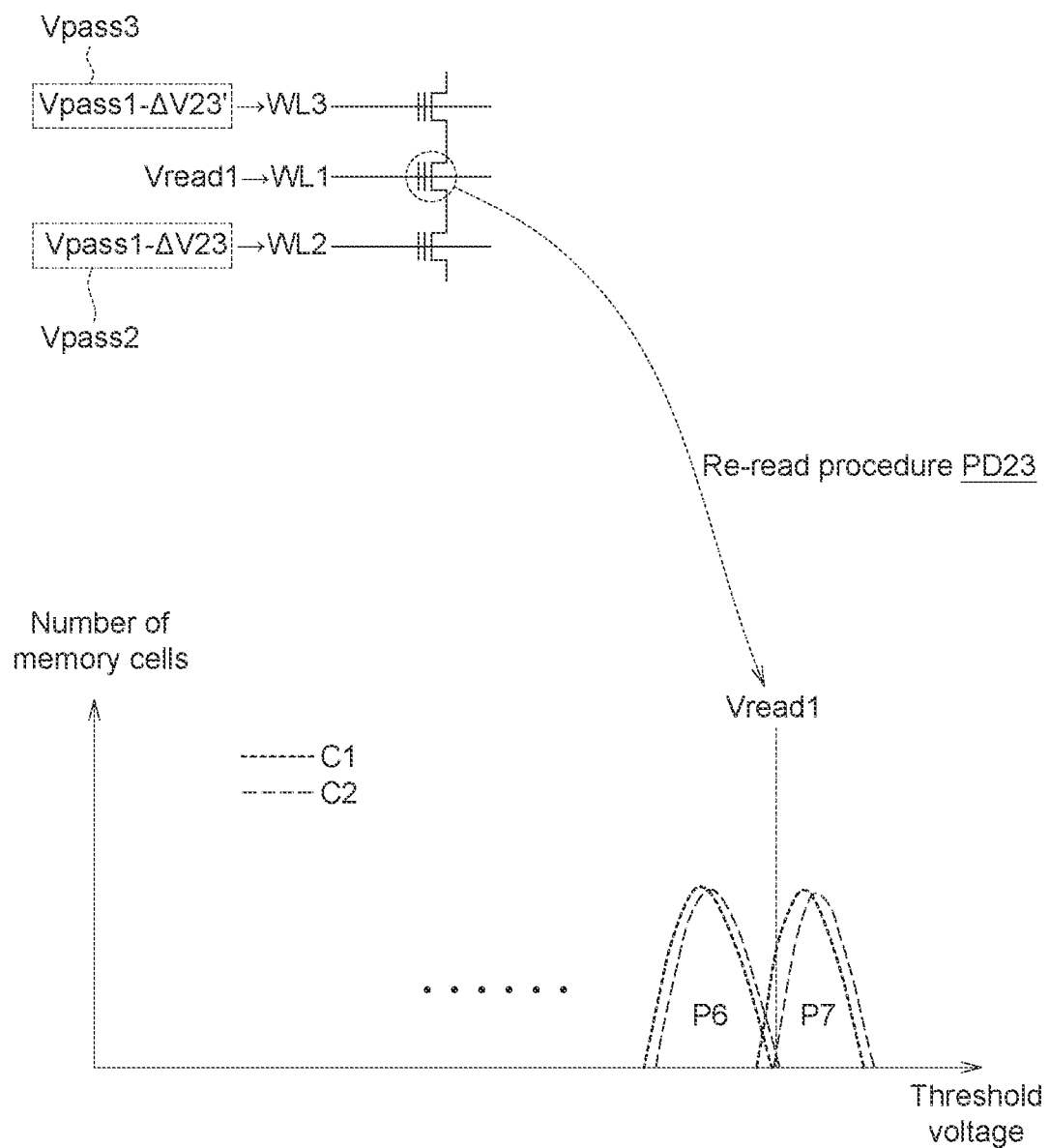
FIG. 23 illustrates the re-read procedure according to another embodiment.

Please refer to FIG. 23, which illustrates the re-read procedure PD23 according to another embodiment. As previously mentioned, the first read voltage Vread1 (e.g., the read voltage Vread67 shown in FIG. 2) is recognized that it belongs to read the memory cells in the high level state group G_H (e.g., the sixth programming state P6 and the seventh programming state P7). After retention beyond a time interval from the programming, the threshold voltage distribution curve (shown as a dashed line C1) become broadened and shift toward a lower threshold voltage (as shown in FIG. 3). In the step S260 of the re-read procedure PD23, the controlling circuit 130 applies the first read voltage Vread1 (e.g., the read voltage Vread67) to the first word line WL1. The first read voltages Vread1 (e.g., the read voltage Vread67) used in the re-read procedure PD23 and the read procedure PD11 are the same. The first read voltage Vread1 (e.g., the read voltage Vread67) only read the memory cells on the neighbor low group curve $C_{nlg}$ on the selected word line (e.g., the word line WL1) having the neighboring data patterns among "LXL", "LXM" or "MXL". The first read voltage Vread1 (e.g., the read voltage Vread67) does not read all memory cells (which are on the dashed line C1) on the selected word line (e.g., the first word line WL1).

Then, in the step S270 of the re-read procedure PD23, the controlling circuit 130 applies a second pass voltage Vpass2 to the second word line WL2. The second pass voltage Vpass2 is lower than the first pass voltage Vpass1. For example, the second pass voltage Vpass2 equals to the first pass voltage Vpass1 minus an adjusting voltage ΔV23. The adjusting voltage ΔV23 is larger than zero.

Then, in the step S280 of the re-read procedure PD23, the controlling circuit 130 applies a third pass voltage Vpass3 to the third word line WL3. The third pass voltage Vpass3 is lower than the first pass voltage Vpass1. For example, the third pass voltage Vpass3 equals to the first pass voltage Vpass1 minus an adjusting voltage ΔV23'. The adjusting voltage ΔV23' is larger than zero. The adjusting voltage ΔV23' may be the same as the adjusting voltage ΔV23, or different from the adjusting voltage ΔV23. Through the adjustment of the second pass voltage Vpass2 and the third pass voltage Vpass3, the threshold voltage distribution curves (shown as a dashed line C2) shift and becomes narrow, thereby the overlap between the sixth programming state P6 and the seventh programming state P7 is decreased to reduce the read errors. Thus, the re-read procedure P23 is effectively improved, and the probability of the read errors is also reduced.

Figure 24:
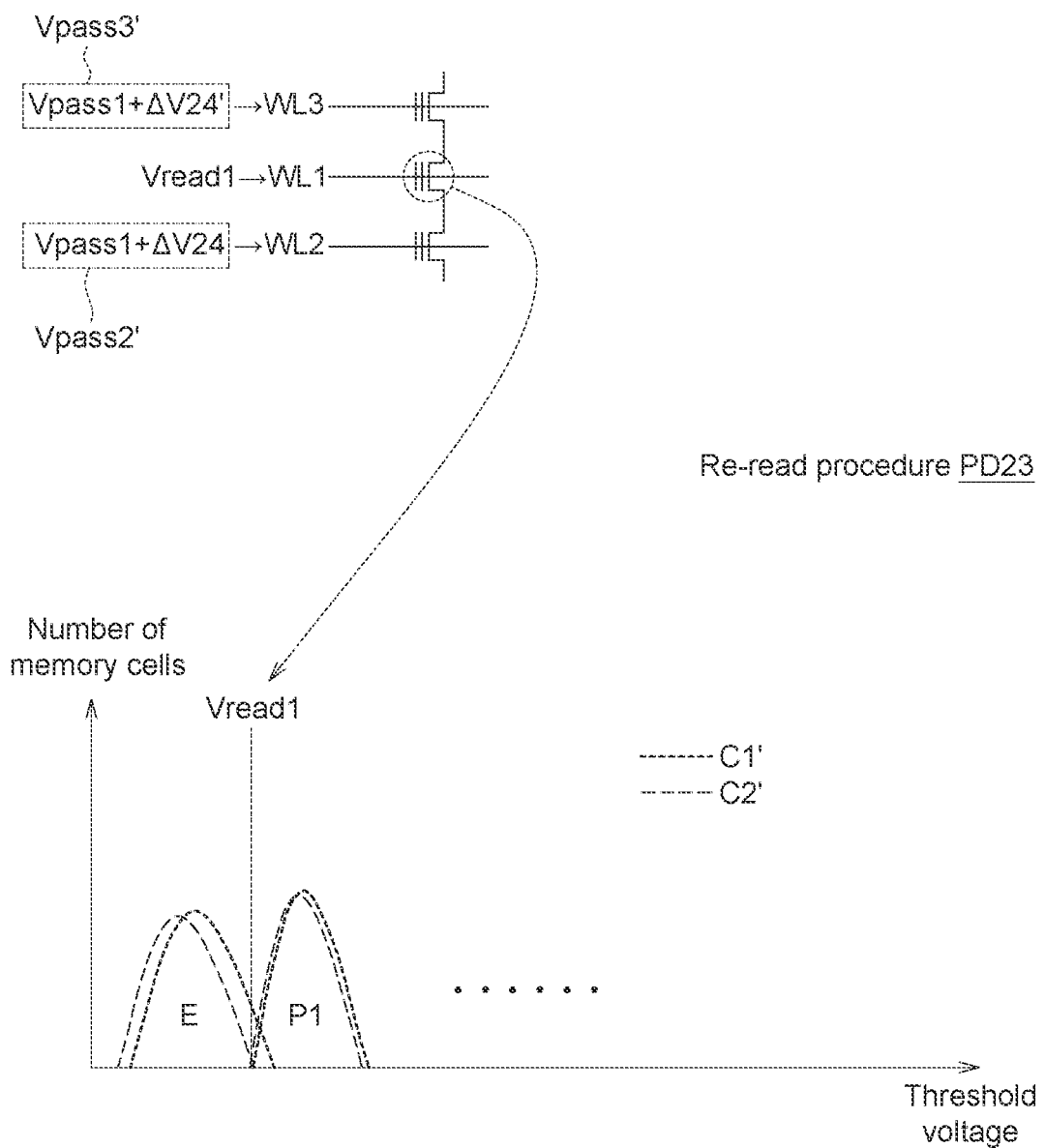
FIG. 24 illustrates the re-read procedure according to another embodiment.

Please refer to FIG. 24, which illustrates the re-read procedure PD23 according to another embodiment. As previously mentioned, the read voltage Vread1 (e.g., the read voltage Vread01 shown in FIG. 2) is recognized that it belongs to read the memory cells in the low level state group G_L (e.g., the erase state E and the first programming state P1). After retention beyond a time interval from the programming, the threshold voltage distribution curve (shown as a dashed line C1') become broadened and shift toward a higher threshold voltage (as shown in FIG. 4). In the step S260 of the re-read procedure PD23 according to the embodiment of FIG. 24, the controlling circuit 130 applies the first read voltage Vread1 (e.g., the read voltage Vread01) to the first word line WL1. The first read voltages Vread1 (e.g., the read voltage Vread01) used in the re-read procedure PD23 and in the read procedure PD11 are the same. The first read voltage Vread1 (e.g., the read voltage Vread01) only read the memory cells on the neighbor high group curve $C_{nhg}'$ on the selected word line (e.g., the first word line WL1) having the neighboring data patterns among "LXH", "HXL", "MXH", "HXM" or "HXH". The first read voltage Vread1 (e.g., the read voltage Vread01) does not read all memory cells (which are on the dashed line C1') on the selected word line (e.g., the first word line WL1).

Then, in step S270 of the re-read procedure PD23, the controlling circuit 130 applies a second pass voltage Vpass2' to the second word line WL2. The second pass voltage Vpass2' is higher than the first pass voltage Vpass1. For example, the second pass voltage Vpass2' equals to the first pass voltage Vpass1 plus an adjusting voltage ΔV24. The adjusting voltage ΔV24 is larger than zero.

Then, in the step S280 of the re-read procedure PD23, the controlling circuit 130 applies a third pass voltage Vpass3' to the third word line WL3. The third pass voltage Vpass3' is higher than the first pass voltage Vpass1. For example, the third pass voltage Vpass3' equals to the first pass voltage Vpass1 plus an adjusting voltage ΔV24'. The adjusting voltage ΔV24' is larger than zero. The adjusting voltage ΔV24' may be the same as the adjusting voltage ΔV24, or different from the adjusting voltage ΔV24. Through the adjustment of the second pass voltage Vpass2' and the third pass voltage Vpass3', the threshold voltage distribution curves (shown as a dashed line C2) shift and becomes narrow, thereby the overlap between the sixth programming state P6 and the seventh programming state P7 is decreased to reduce the read errors. Thus, the re-read procedure P23 is effectively improved, and the probability of the read errors is also reduced.

The read procedure PD11, the recognition procedures PD12, PD22, PD32, and the re-read procedures PD13, PD23 disclosed in the above embodiments can be implemented interactively, and are not limited to the content disclosed in the figures.

Through the above embodiment, after the controlling circuit 130 reads the memory cells on the memory device 100, if a read error occurs on the memory cells of the selected word line (e.g., the first word line WL1), the controlling circuit 130 recognizes the read voltage of the level state, and determines the read error occurs in the high level state group G_H or the low level state group G_L. After determining the read error occurring in the high level state group G_H or the low level state group G_L, the threshold voltage distribution curve of the memory cells of the specific level state group after retention can be evaluated to shift toward a lower threshold voltage or a higher threshold voltage. Then, the controlling circuit 130 recognizes the neighboring data pattern, i.e. the neighboring-high-threshold-voltage group NH1 or the neighboring-low-threshold-voltage group NL1 for the memory cells of the selected (or failure) word line (e.g., The first word line WL1). Then, the controlling circuit 130 executes a re-read procedure for a portion of the memory cells on the selected word line (e.g., the first word line WL1), so as to improve the reading efficiency and increase the reading accuracy.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A reading method of a memory device, wherein the memory device at least includes a first word line, a second word line and a third word line, the second word line and the third word line are adjacent to the first word line, and the reading method comprises:
   executing a read procedure, to read a plurality of memory cells connected to the first word line, wherein the read procedure includes:
      applying a first read voltage to the first word line; and
      applying a first pass voltage to the second word line and the third word line, when the first read voltage is applied to the first word line; and
   executing a recognition procedure in response to at least one memory cell of the plurality of memory cells has a read error, wherein the recognition procedure includes:
      applying the first pass voltage to the first word line; and
      applying a recognition voltage to at least one of the second word line and the third word line, when the first pass voltage is applied to the first word line; and
   executing a re-read procedure including:
      applying a second read voltage to the first word line; and
      applying a second pass voltage to the second word line and a third pass voltage to the third word line, when the second read voltage is applied to the first word line.

2. The reading method of the memory device according to claim 1, wherein during the re-read procedure, the second read voltage is different from the first read voltage.

3. The reading method of the memory device according to claim 2, wherein during the re-read procedure, the second read voltage is applied on a portion of the plurality of memory cells connected to the first word line.

4. The reading method of the memory device according to claim 2, wherein during the re-read procedure, the second pass voltage and the third pass voltage equal to the first read voltage.

5. The reading method of the memory device according to claim 2, wherein during the re-read procedure, the second read voltage is different from the first read voltage.

6. The reading method of the memory device according to claim 1, wherein during the recognition procedure, the first pass voltage is applied to the first word line, and the recognition voltage is applied to the second word line and the third word line.

7. The reading method of the memory device according to claim 1, wherein during the recognition procedure, the first pass voltage is applied to the first word line and the third word line, and the recognition voltage is applied to the second word line.

8. The reading method of the memory device according to claim 1, wherein the first read voltage is recognized to belong to a high level state group or a low level state group in response to the read error.

9. The reading method of the memory device according to claim 1, wherein during the re-read procedure, the second pass voltage and the third pass voltage are different from the first read voltage.

10. The reading method of the memory device according to claim 9, wherein during the re-read procedure, the second pass voltage is different from and the third pass voltage.

11. A memory device, at least comprising:
    a first word line;
    a second word line;
    a third word line, wherein the second word line and the third word line are adjacent to the first word line; and
    a controlling circuit, configured to execute a read procedure, to read a plurality of memory cells of the first word line; configured to execute a recognition procedure in response to a read error of at least one memory cell of the plurality of memory cells; and configured to execute a re-read procedure,
    wherein in the read procedure,
       the controlling circuit applies a first read voltage to the first word line; and
       the controlling circuit applies a first pass voltage to the second word line and the third word line when the first read voltage is applied to the first word line;
    in the recognition procedure,
       the controlling circuit applies the first pass voltage to the first word line; and
       the controlling circuit applies a recognition voltage to at least one of the second word line and the third word line when the first pass voltage is applied to the first word line;
    in the re-read procedure,
       the controlling circuit applies the second read voltage to the first word line; and
       the controlling circuit applies a second pass voltage to the second word line and a third pass voltage to the third word line, when the second read voltage is applied to the first word line.

12. The memory device according to claim 11, wherein during the re-read procedure, the second read voltage is different from the first read voltage.

13. The memory device according to claim 12, wherein during the re-read procedure, the second read voltage is applied on a portion of the plurality of memory cells connected to the first word line.

14. The memory device according to claim 12, wherein during the re-read procedure, the second pass voltage and the third pass voltage equal to the first read voltage.

15. The memory device according to claim 12, wherein during the re-read procedure, the second read voltage is different from the first read voltage.

16. The memory device according to claim 11, wherein during the recognition procedure, the first pass voltage is applied to the first word line, and the recognition voltage is applied to the second word line and the third word line.

17. The memory device according to claim 11, wherein during the recognition procedure, the first pass voltage is applied to the first word line and the third word line, and the recognition voltage is applied to the second word line.

18. The memory device according to claim 11, wherein the first read voltage is recognized to belong a high level state group or a low level state group in response to the read error.

19. The memory device according to claim 11, wherein during the re-read procedure, the second pass voltage and the third pass voltage are different from the first read voltage.

20. The memory device according to claim 19, wherein during the re-read procedure, the second pass voltage is different from and the third pass voltage.

* * * * *